United States Patent [19]

Kaneko

[11] Patent Number: 5,560,290

[45] Date of Patent: Oct. 1, 1996

[54] SAFETY APPARATUS IN POWER PRESS MACHINE

[76] Inventor: Keiko Kaneko, 152, Hiromoto, Kamotacho, Okazaki-shi, Aichi-ken, Japan

[21] Appl. No.: 379,206

[22] Filed: Jan. 27, 1995

[30] Foreign Application Priority Data

Jan. 28, 1994 [JP] Japan .................................. 6-026343
May 11, 1994 [JP] Japan .................................. 6-123207

[51] Int. Cl.⁶ .................................................. B30B 15/28
[52] U.S. Cl. .......................... 100/53; 74/615; 192/131 H; 192/134
[58] Field of Search ................ 100/53; 74/615; 192/131 R, 131 H, 134

[56] References Cited

U.S. PATENT DOCUMENTS

| | | | |
|---|---|---|---|
| 3,103,270 | 9/1963 | Tilbury | 192/131 R |
| 3,186,256 | 6/1965 | Reznick | 74/615 |
| 3,276,557 | 10/1966 | Brown | 192/134 |
| 4,113,079 | 9/1978 | Wright | 100/53 |
| 4,177,666 | 12/1979 | Du Bois et al. | 100/53 |
| 4,235,324 | 11/1980 | Neild | 192/131 H |

FOREIGN PATENT DOCUMENTS

| | | | |
|---|---|---|---|
| 59-199200 | 11/1984 | Japan | 100/53 |
| 6905597 | 10/1970 | Netherlands | 100/53 |
| 225742 | 12/1924 | United Kingdom | 192/134 |

*Primary Examiner*—Stephen F. Gerrity
*Attorney, Agent, or Firm*—Wenderoth, Lind & Ponack

[57] ABSTRACT

A safety apparatus is mounted to the side of a bed of a power press machine on which an operator is positioned for ensuring safety of the operator of the power press machine. The safety apparatus includes a table, for supporting the front end portion of a workpiece, fitted so as to be movable toward and away from the bed at substantially the same height as a fixed mold set to the bed side and on the side of the bed where the operator is positioned. A pair of two-hand operation type switches are fitted to the front side portion of the table with a gap between them, and are operated by both hands of the operator. A deactivating switch is provided for deactivating the pair of two-hand operation type switches when a movable mold set to slide portion side of the power press machine approaches to within predetermined distance of the fixed mold set to the bed side to provide a safety state. Thus, the slide portion is allowed to operate only when the pair of two-hand operation type switches are operated by both hands of the operator and are turned on.

8 Claims, 25 Drawing Sheets output terminal

SAFETY APPARATUS IN POWER PRESS MACHINE

BACKGROUND OF THE INVENTION

This invention relates to a safety apparatus in a power press machine, which is fitted to the side of a bed of a power press machine on which an operator is positioned, so as to insure safety of the operator.

Press work with a power press machine is extremely dangerous work which might lead to permanent troubles for the operator. Therefore, according to a law, the safety apparatus must be fitted to the power press machine. A ray type, a two-hand operation type and a guard type safety apparatus are typical examples of the safety apparatus of the power press machine, and all of them have been widely used. However, they are not free from the problems inherent thereto and are not yet entirely satisfactory.

The ray type safety apparatus comprises a projector and a light receiver, detects a dangerous state when a part of the body of the operator intercepts the rays of light, and stops the operation of a slide portion. The law stipulates that the safety apparatus must effectively operate through the whole stroke of the slide portion of the press machine, and its fitting position is limited, too.

However, when the ray type safety apparatus is fitted to the fitting position stipulated by the law and the press work is conducted, not only the body of the operator but also a part of his clothes cut off (i.e. interfere with) the rays of light. As a result, the operation of the press machine is stopped, or the operator must be spaced away from the press machine by a predetermined distance to execute the work. In other words, safety is improved at the expense of working efficiency.

Depending on the content of the press work, there is the case where the operator cannot help holding a part of the workpiece with his hand to conduct the press work. In this case, a part of the body of the operator cuts off the rays of light and the ray type safety apparatus starts operating.

Further, when the workpiece is bent, no problem occurs when a flat sheet-like operation is simply bent into an L shape by one bending workpiece, but when the flat sheet-like work is bent around its four sides in the same direction to obtain a box-like shape, the rays of light are sometimes cut off by the portions which have been bent already. Accordingly, depending upon the shape of the product produced by bending the workpiece, the ray type safety apparatus cannot be used in some cases.

As described above, the ray type safety apparatus involves various problems in the actual press operation.

In the two-hand operation type safety apparatus, the slide portion of the press machine cannot be operated unless switches such as push buttons are simultaneously operated by both hands. Moreover, each time one of the hands is removed off from the switch during the operation of the slide portion, the slide portion stops, or the slide portion is caused to stop at each process step. Thus the operation cannot be re-started unless both hands of the operator are removed from the switches for another process step.

To further improve safety, there is a system which combines the two-hand operation type switches with a foot switch. In any case, the bending work cannot be carried out by one operator in the case of bending workpiece in which a part of the work must be gripped by the hand. In this case, the content of the bending work is greatly limited and the working efficiency drops considerably.

The guard type safety apparatus is literally equipped with a guard for preventing the hands of the operator from entering a molding portion of the press machine. The guard is produced in such a manner as to correspond to the shapes of the workpiece and the shaped article, and is fitted to the molding portion. In this system, the guard which has been produced in advance so as to correspond to the workpiece and to the shaped article must be fitted again whenever the workpiece and the shaped article change. Therefore efficiency of the process is low, and the cost of production of the guard also increases overall cost.

For these reasons, various modifications are made by individual users in the ray type and two-hand type safety apparatuses when using them, and these modifications result in a large number of press accidents.

SUMMARY OF THE INVENTION

It is a first object of the present invention to improve safety without lowering efficiency of the press work by making it possible to operate a pair of two-hand operation type switches while the workpiece is gripped.

It is a second object of the present invention to expand the range of the press work by disposing a large number of pin holes in a table for supporting thereon a workpiece, which is movable with respect to a bed of the power press machine, and removably fitting various machining jigs to the table by utilizing these pin holes.

It is a third object of the present invention to improve safety of the press work by preventing a part of the body of the operator from entering the molding portion of the power press machine by utilizing plate which is fitted to the table by utilizing the pin holes described above.

The present invention provides an operator-safety apparatus for use fitted to the side of a bed of a power press machine on which the operator is positioned. The apparatus includes a table for supporting the front end portion of a workpiece, fitted so as to be movable toward and away from the bed at the same height as a fixed mold set to the bed side and on the side of the bed where the operator is positioned. A pair of two-hand operation type switches fitted to the front side portion of the table with a minimum gap set between them, and these are operated by both hands of the operator. A deactivating switch is provided for deactivating the pair of two-hand operation type switches when a movable mold set to a slide portion side of the power press machine approaches to within a predetermined distance of the fixed mold set to the bed side to provide a safety state. The slide portion is allowed to operate only when the pair of two-hand operation type switches are operated by both hands of the operator and are turned ON.

DETAILED DESCRIPTION OF THE INVENTION

Hereinafter, the present invention will be explained in further detail with reference to embodiments thereof. A press machine to which the safety apparatus according to the present invention is adapted has a construction having a quick stop mechanism.

In FIGS. 1 to 4, a pair of guide bars 2 are horizontally supported on a bed 1 of a power press machine with a predetermined gap between them on the side where an operator is positioned. A slider 3 is fitted to each of these guide bars 2. A table support member 5 is integrally fitted to the inside of each slider 3 in such a manner as to support a table 4 from below and to be capable of adjusting the height of the table 4.

Figure 1:
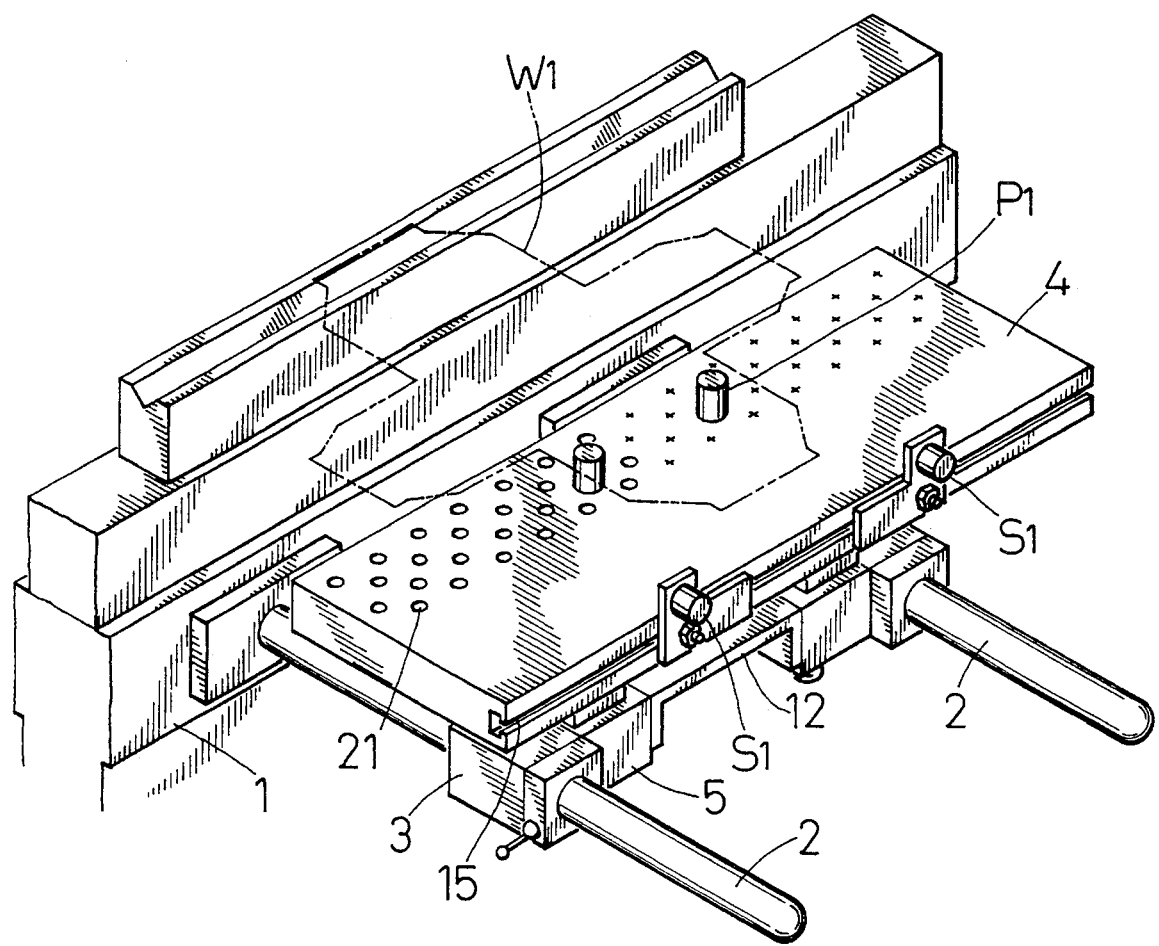
FIG. 1 is an overall perspective view of a safety apparatus for a power press machine according to the present invention.
Figure 2:
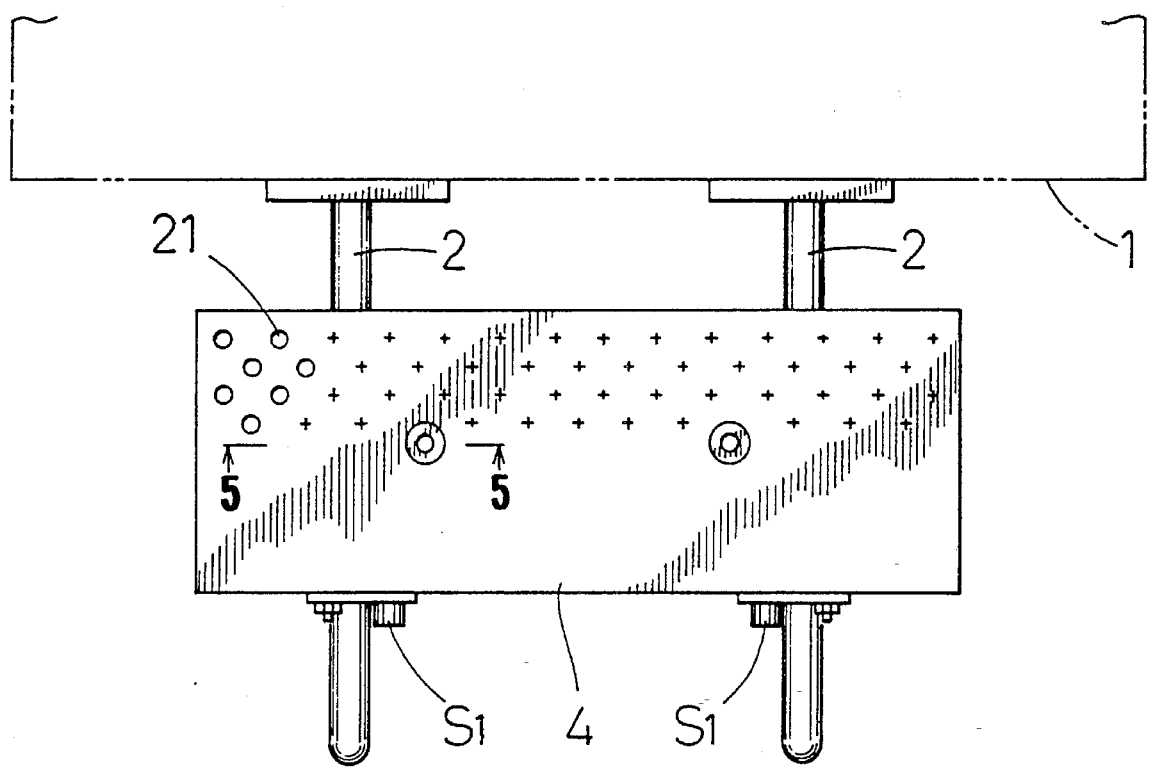
FIG. 2 is a plan view of the safety apparatus.
Figure 3:
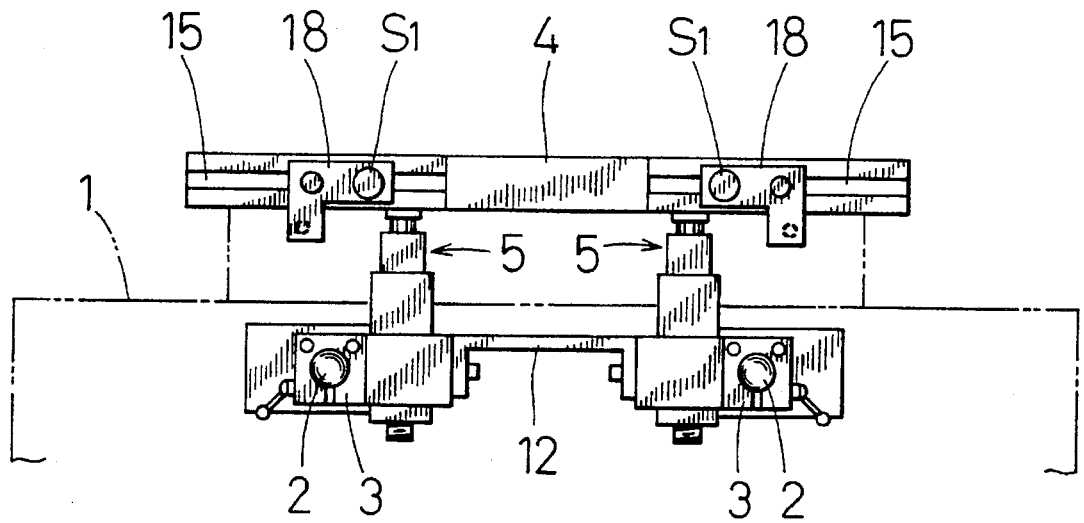
FIG. 3 is a front view of the safety apparatus.
Figure 4:
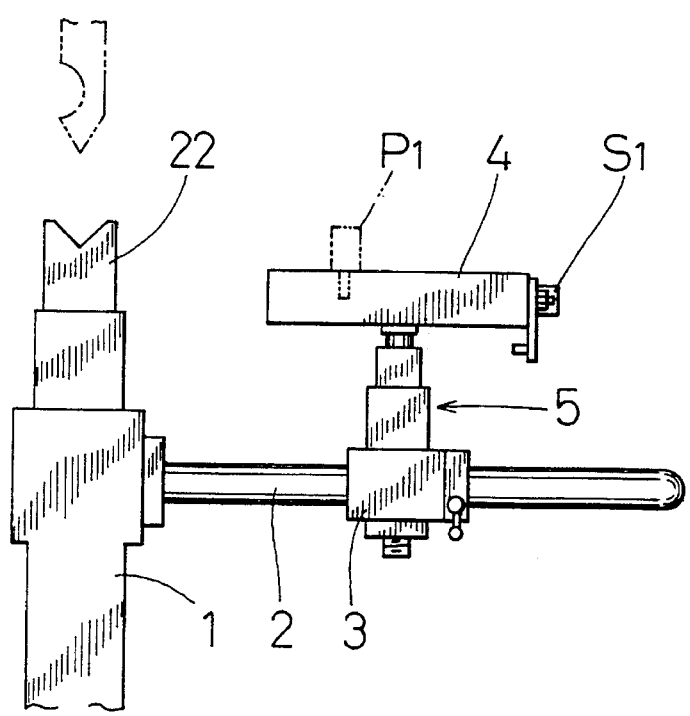
FIG. 4 is a side view of the safety apparatus.
Figure 5:
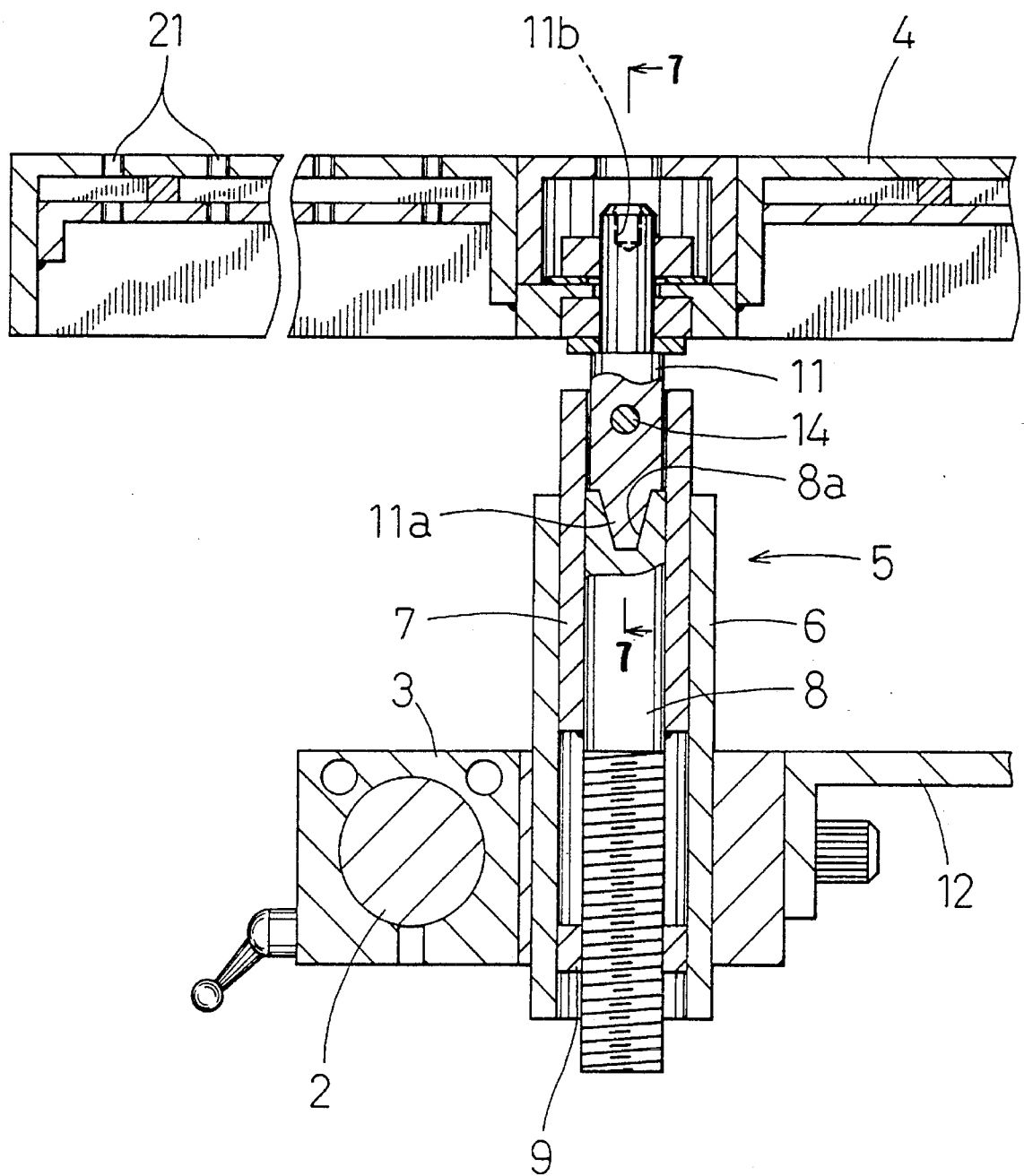
FIG. 5 is an enlarged sectional view taken along a line 5—5 of FIG. 2.
Figure 6:
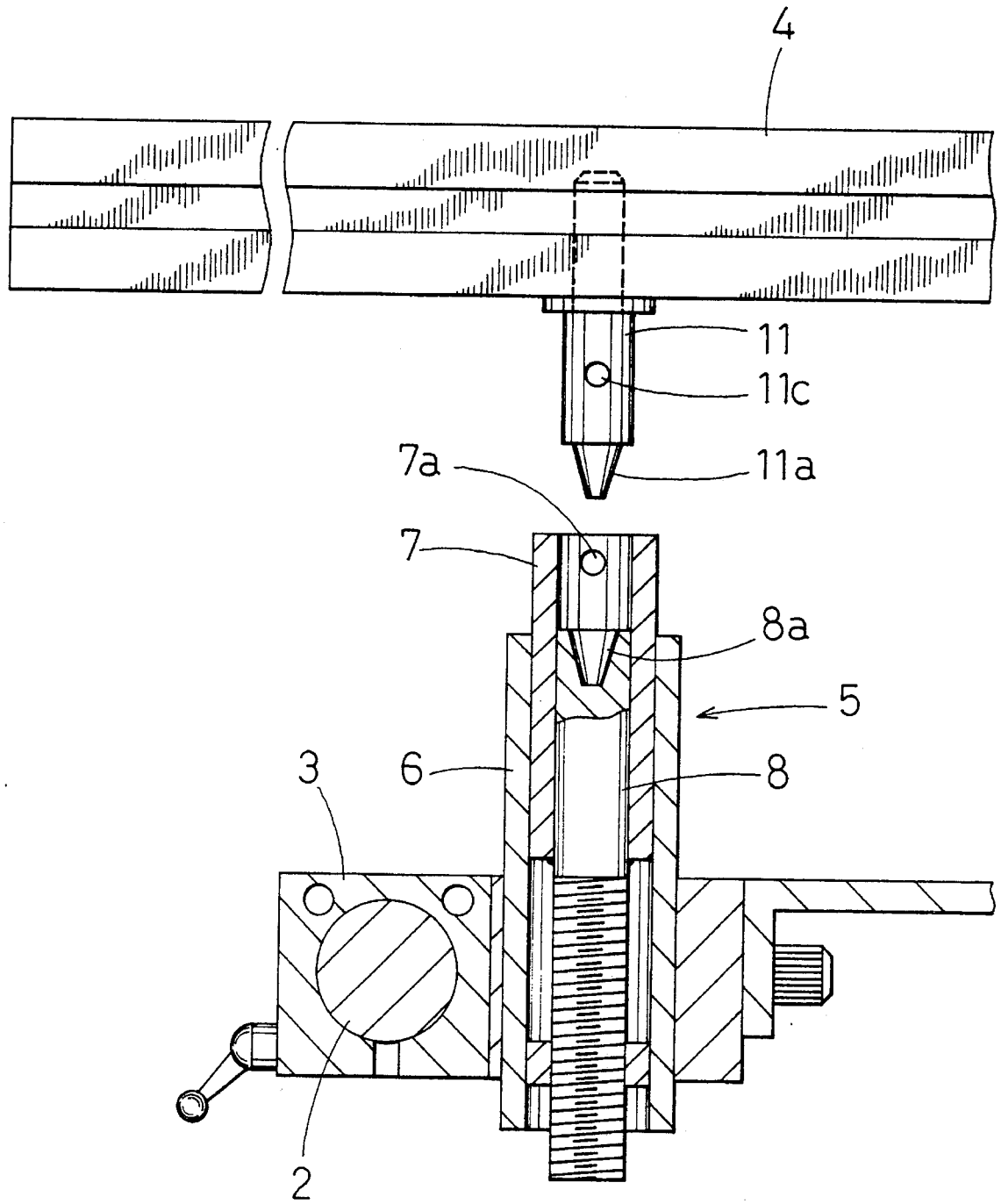
FIG. 6 is an enlarged sectional view in a state where a table 4 is removed from a pair of table support members 5.
Figure 7:
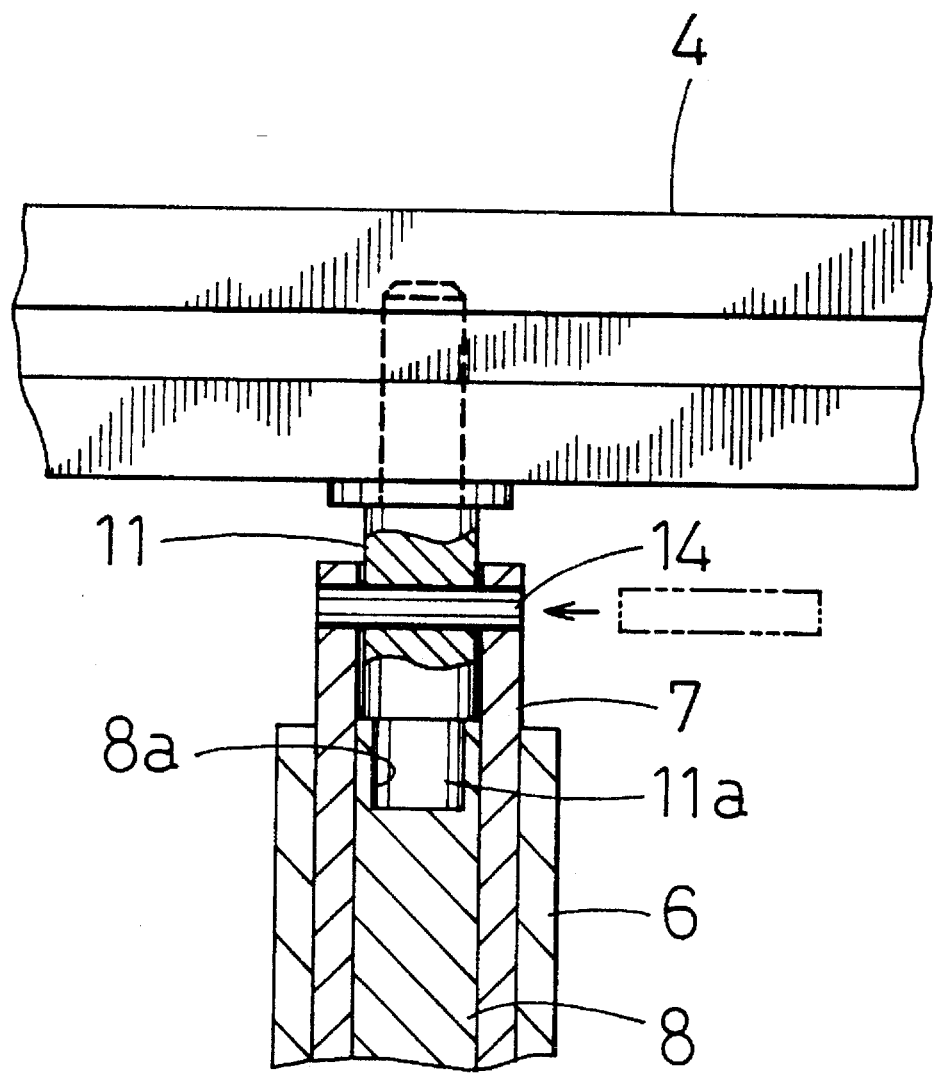
FIG. 7 is a sectional view taken along a line 7—7 of FIG. 5.

As shown in FIGS. 5 to 7, the table support member 5 comprises an outer cylinder 6 integrally fitted to the slider 3 and an inner cylinder 7 fitted to the inside of the outer cylinder 6 upper half portion of an adjustment bolt 8 is integrally welded to the inner cylinder 7, and its lower end portion is meshed with a female screw member 9 fixed to the inner periphery of the lower end portion of the outer cylinder 6. An engagement hole 8a is defined at the upper end portion of the adjustment bolt 8, and a pin insertion hole 7a is formed at the upper end portion of the inner cylinder 7.

A connecting rod 11 is so disposed at a portion on the back of the table 4 immediately above the table support member 5 as to rotatably protrude downward, and an engagement protuberance 11a meshing with the engagement hole 8a of the adjustment bolt 8 is disposed at the lower end portion of this connecting rod 11. A tool insertion hole 11b for inserting a tool for rotating the connecting rod 11 is disposed on the upper end surface of the connecting rod 11, and a pin insertion hole 11c is disposed at the central portion of this tool insertion hole 11b.

The table support members 5 are integrally connected through a connecting member 12. The connecting rods 11 protruding from the back of the table 4 are fitted into the inner cylinders 7 of the table support members 5, respectively, and the engagement protuberances 11a are fitted into, and meshed with, the engagement holes 8a of the adjustment bolts 8, respectively. Furthermore, the connecting pin 14 is fitted into the pin insertion hole 7a of the inner cylinder 7 and the pin insertion hole 11c of the connecting rod 11. In this way, the table 4 can be removably fitted to the pair of table support members 5. The table 4 can be removed from the pair of table support members 5 by the mere steps of removing each connecting pin 14 and then lifting up the table 4.

As shown in FIGS. 1, 3, 8 and 9, T grooves 15 are formed along the entire portion of the end surface of the table 4 on the front side other than at its center portion, and a head 16a of a T bolt 16 is fitted into the T groove 15 on each side. A switch fitting plate 18 can be fixed to an arbitrary position by this T bolt 16 and a nut 17.

The switch fitting plate 18 has an L shape, and a push button switch $S_1$ of a double-hand operation system is fitted to one of the ends of the switch fitting plate 18. An engagement pin 19 is so fitted to the other end as to protrude inward. In other words, a pair of right and left push button switches $S_1$ are disposed, and can be moved to, and fixed at, arbitrary positions by loosening the nut 17 and moving the switch fitting plate 18 to the right and left. Further, the position of the push button switch $S_1$ can be raised with respect to the table 4 as indicated by two-dot-chain line in FIG. 9 by removing the nut 17, then turning substantially 90° the switch fitting plate 18, inserting the engagement pin 19 into the T groove 15 and fixing the switch fitting plate 18 to the front surface of the table 4.

The reason why the position of the push button switch $S_1$ to the table 4 is elevated is to cope with a bending workpiece having a flange portion as will be described later. The minimum gap between the pair of right and left push button switches $S_1$ is such that the switches cannot be simultaneously operated by one hand of the operator and the gap is about 300 mm.

Figure 11:
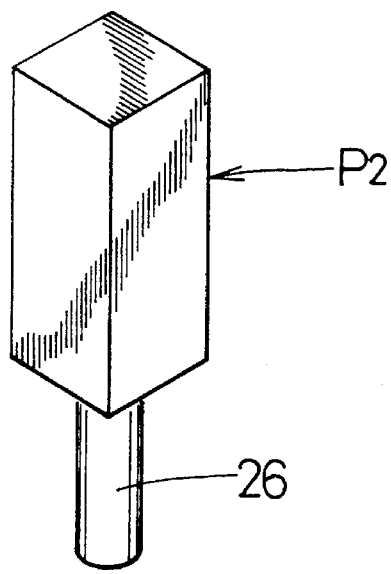
FIG. 11 is a perspective view of a work receiving pin $P_2$.
Figure 12:
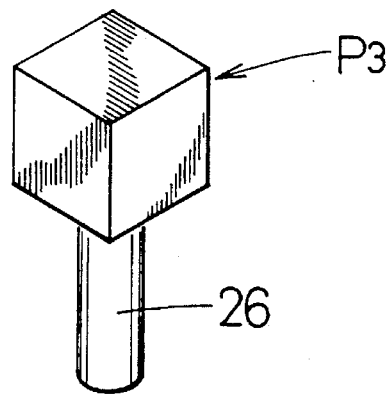
FIG. 12 is a perspective view of a work receiving pin $P_3$.

As shown in FIGS. 1, 2, 5 and 10, a large number of pin holes 21 are formed at the depth of the table 4 with the standing position of the operator as the reference. Work receiving pins $P_1$ to $P_3$ having various shapes (see FIGS. 10 to 12) to cope with the bending workpiece having the flange portion or side gauges 28 (see FIG. 24) for positioning the workpiece in the transverse direction, or other machining Jigs, are removably fitted into these pin holes 21.

Figure 13:
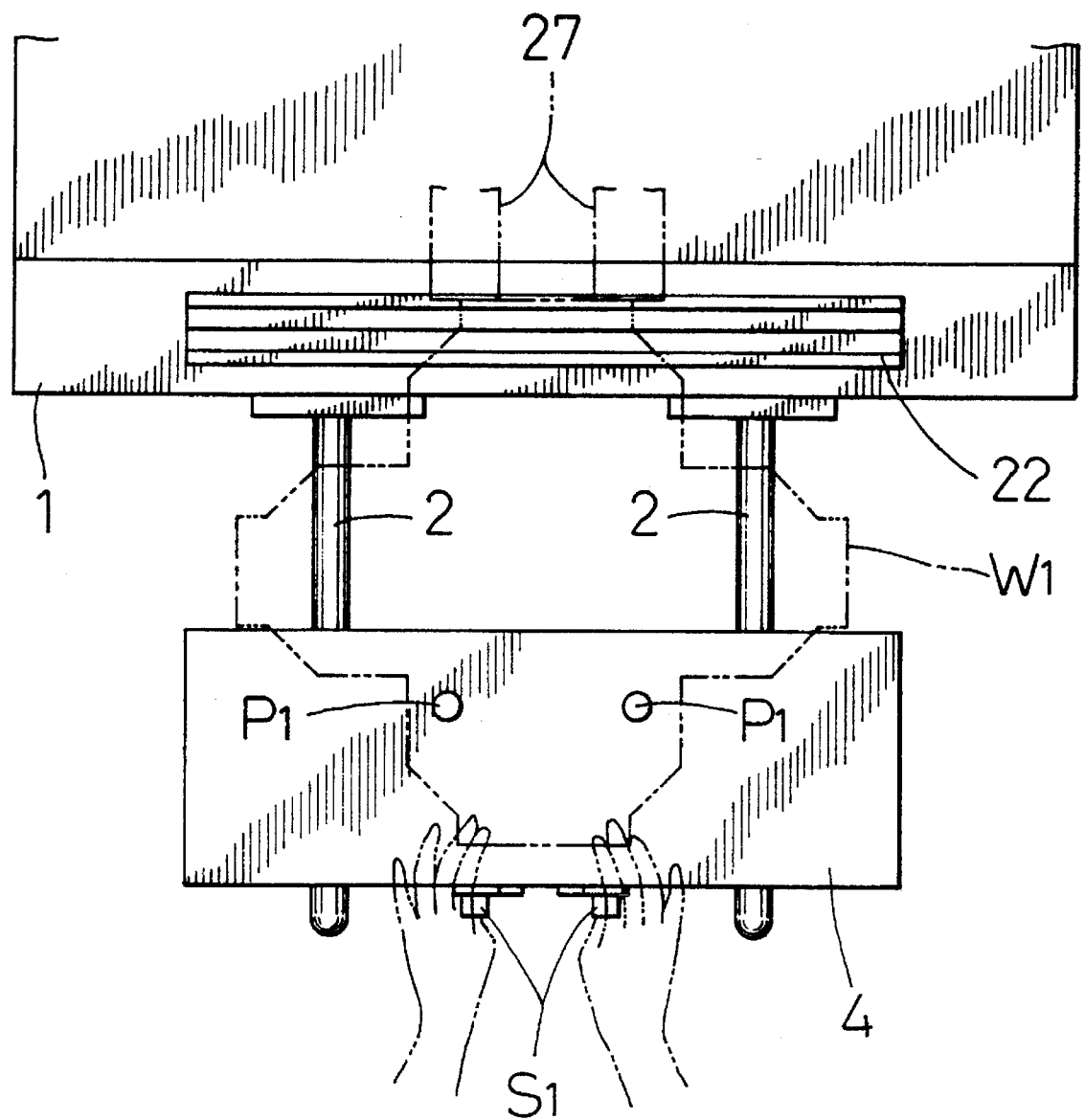
FIG. 13 is a plan view in a state where bending work of a workpiece $W_1$ has started.
Figure 14:
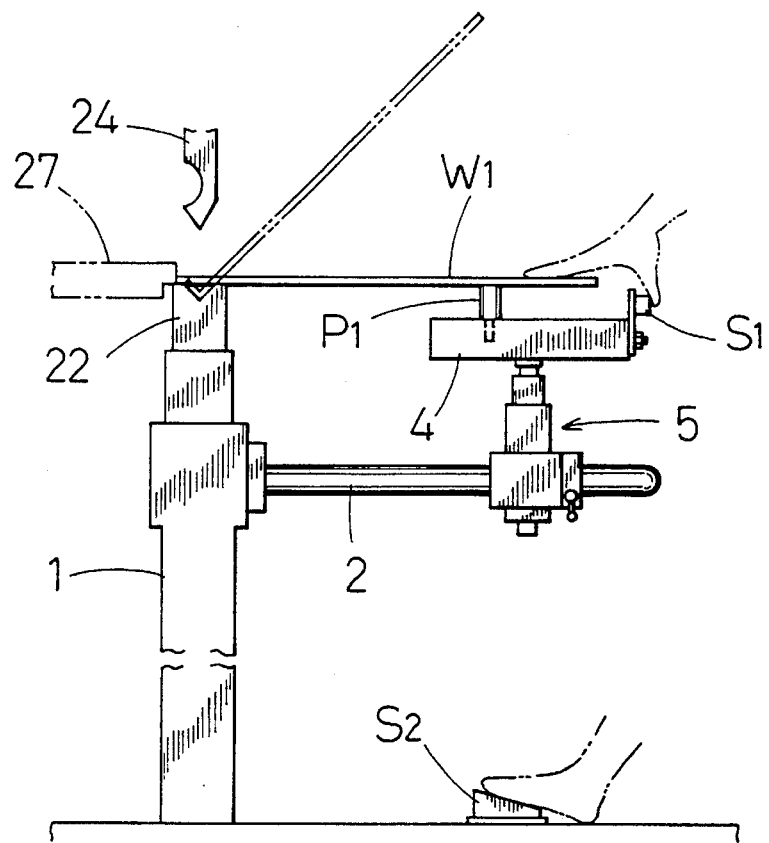
FIG. 14 is a side view of the work $W_1$.

In FIGS. 13 and 14, a V-shaped die 22 as a lower mold is set to the upper surface of the bed 1 of the power press machine, and a punch 24 as an upper mold is set to a slide portion 23 (see FIG. 25) disposed above the bed 1.

Figure 28:
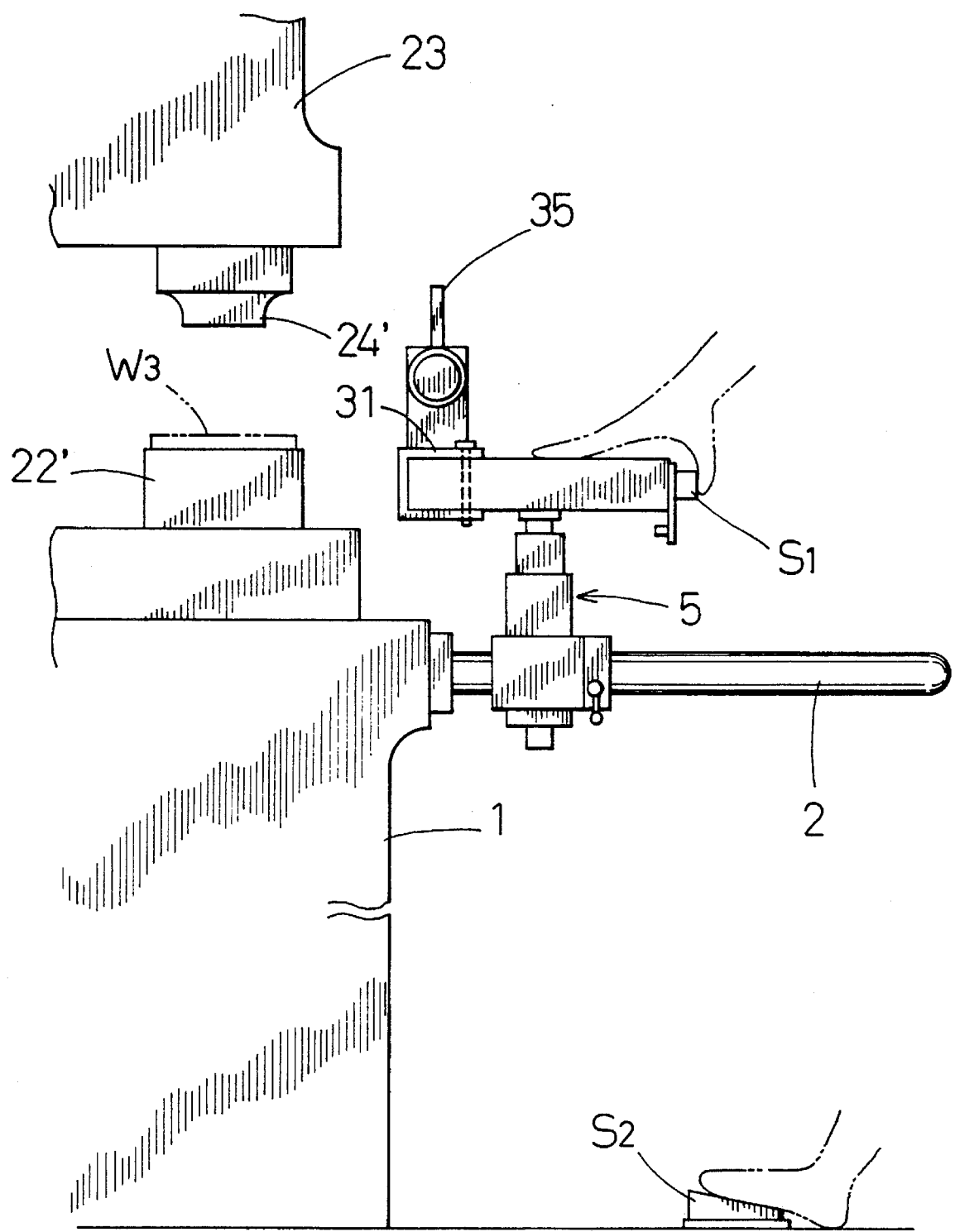
FIG. 28 is a side view in a state where the guard plate 35 described above is fitted to the table 4 of the safety apparatus according to the present invention and a press operation is carried out.
Figure 29:
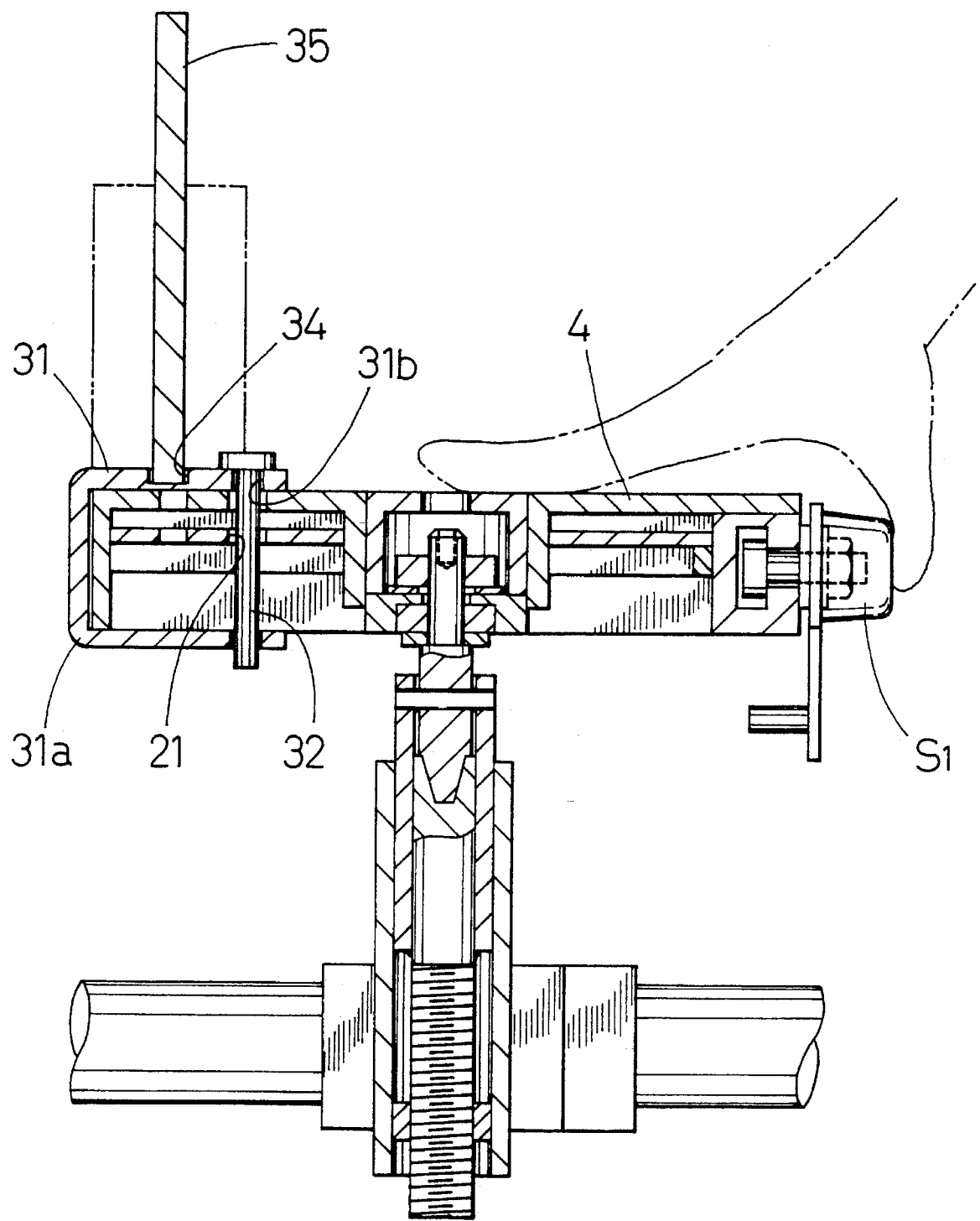
FIG. 29 is a partial exploded side view mainly showing the fitting state of the guard plate 35 to the table 4.
Figure 30:
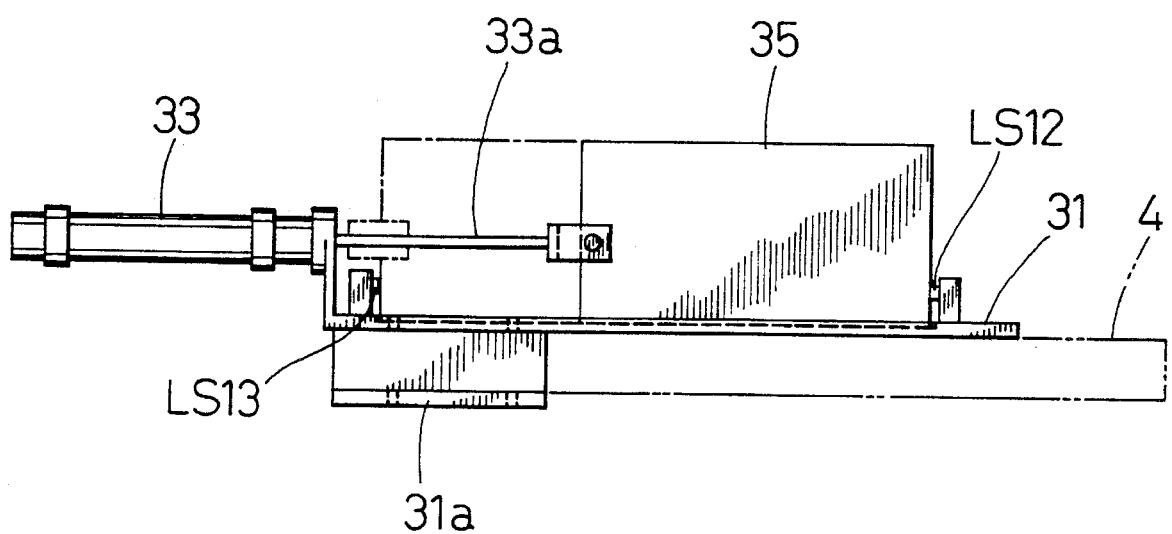
FIG. 30 is a substantial front view in a state where the guard plate 35 described above is fitted to the table 4 of the safety apparatus according to the present invention.

A foot switch $S_2$ operated by the foot of the operator is disposed at the front part of the bed 1 on which the safety apparatus according to the present invention is disposed, and as shown in the operation circuit diagram of FIG. 28, the power press machine is constituted in such a manner that it can be operated only when the pair of push button switches $S_1$ are pushed and turned ON and moreover, when the foot switch $S_2$ is pushed and turned ON.

Figure 25:
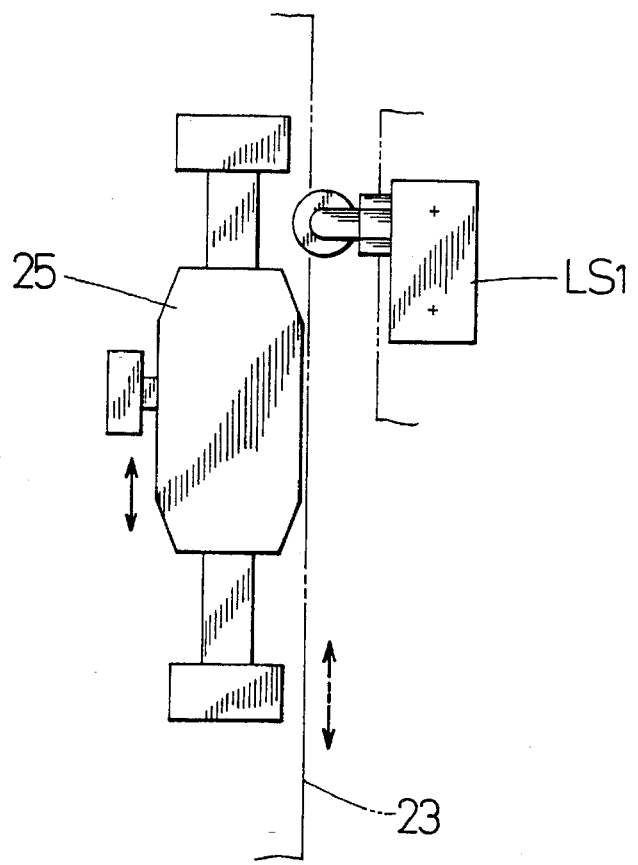
FIG. 25 is a partial enlarged view of an deactivating switch $S_3$.

The safety apparatus according to the present invention is equipped with an deactivating switch for deactivating the pair of push button switches $S_1$ when the punch 24 lowers and approaches within a predetermined distance of the die 22 to provide the safety state. In other words, as shown in FIG. 25, a limit switch $LS_1$ functioning as the invalid switch is disposed in the proximity of the slide portion 23, and when the slide portion 23 lowers, a dog 25 provided to the slide portion 23 actuates the limit switch $LS_1$. The position of the dog 25 can be adjusted so that the operation start position of the limit switch $LS_1$ can be finely adjusted.

Figure 20:
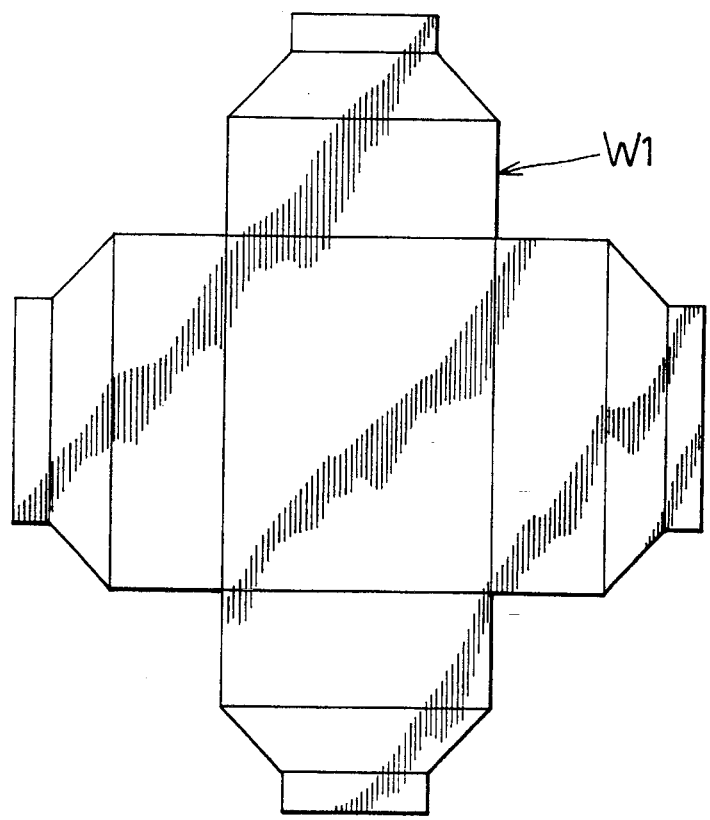
FIG. 20 is a plan view of the workpiece $W_1$.
Figure 21:
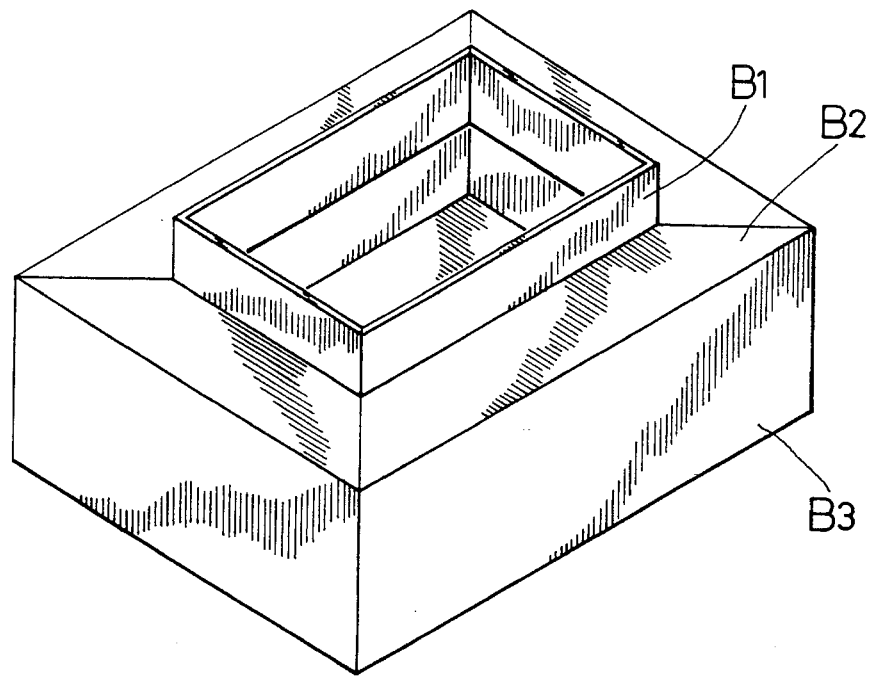
FIG. 21 is a perspective view of a box body formed by bending the workpiece $W_1$.

Next, the explanation will be given for the case where a workpiece $W_1$ shaped by punching as shown in FIG. 20 is bent into a box shape shown in FIG. 21. First, as shown in FIGS. 13 and 14, the insertion portions 26 of the workpiece receiving pins $P_1$ are fitted into a plurality of pin holes 21 disposed in the table 4, and a tool (not shown) is fitted into the tool insertion hole 11b of the connecting rod 11 from the upper surface of the table 4. Next, the table 4 is lowered by turning the connecting rod 11 in a predetermined direction, and adjustment is then carried out so that the reception surface of a plurality of workpiece receiving pins $P_1$ fitted into the pin holes 21 at their insertion portion 26 takes the same level as the die 22 set to the bed 1.

The gap between the switch fitting plates 18 to which the pair of push button switches $S_1$ are set to a gap which can grip the workpiece $W_1$, and the switch fitting plates 18 are turned by a predetermined angle from the normal state of use so that grip of the workpiece $W_1$ and the operation of the push button switches $S_1$ can be simultaneously made. (In the embodiment shown in the drawings, the push button switches $S_1$ exist at the highest position when the switch fitting plate 18 is turned by 90° from the normal state of use.)

In this way, the workpiece $W_1$ is supported by a plurality of workpiece receiving pins $P_1$ and the die 22, and the distal end surface of the workpiece $W_1$ is butted against the back gauge 27 for the purpose of positioning. In this state, as shown in FIGS. 13 and 14, the front side of the workpiece $W_1$ is gripped and its bending is carried out under the posture where each push button switch $S_1$ can be operated by both hands of the operator.

In other words, while the operator grips the end portion on front side of the workpiece $W_1$ with both hands, the pair of push button switches $S_1$ are pushed and turned ON by both hands and the foot switch $S_1$ is pushed and turned ON by his foot. Then, a signal for actuating the power press machine is generated from the safety apparatus, the punch 24 as the upper mold lowers, and one of the end portions of the workpiece $W_1$ is bent.

In this instance, as the punch 24 lowers by a predetermined distance and if one of the hands of the operator comes off from the push button switch $S_1$ before the safety state where the limit switch $LS_1$ as the deactivating switch operates, the actuation circuit of the press machine is opened and punch 24 is stopped instantly. In this way, safety of the operator is insured.

Figure 26:
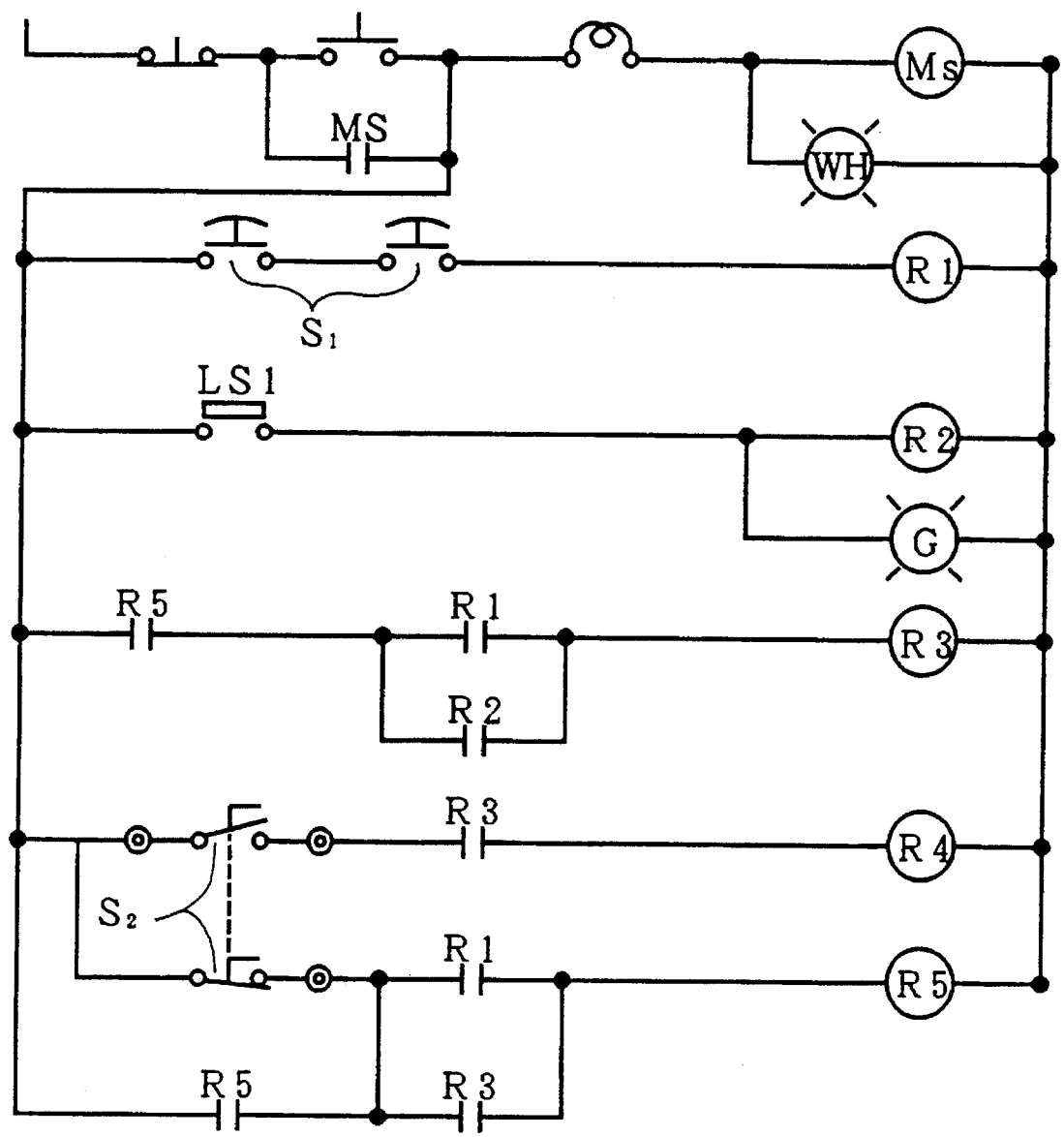
FIG. 26 is an operation circuit diagram of the safety apparatus according to the present invention.
Figure 26:
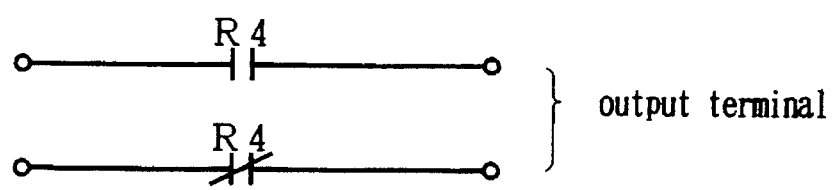
Figure 27:
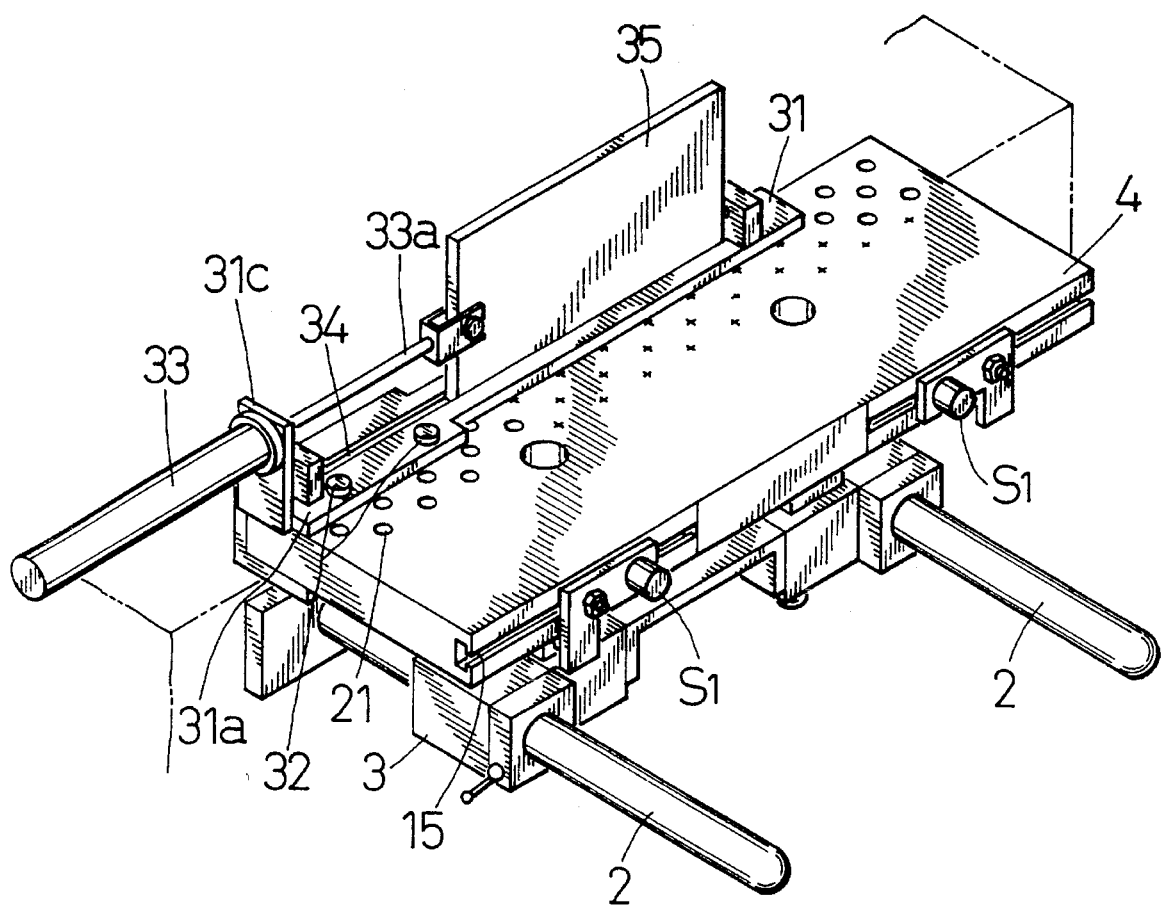
FIG. 27 is a perspective view in a state where a guard plate 35 operated by an air cylinder 33 is mounted to the table 4 of the safety apparatus according to the present invention.

The above will be explained on the basis of the operation circuit diagram of FIG. 26 of the safety apparatus according to the present invention. When the pair of push button switch $S_1$ are turned ON, the relay $R_1$ is energized and its a contact is closed. Here, if the foot switch $S_2$ is kept OFF, the relay $R_5$ is energized and its a contact is closed. Accordingly, because the relay $R_3$ is energized, the relay $R_2$ is self-held while the pair of push button switches $S_1$ are ON. When the foot switch $S_1$ is turned ON under this state, the relay $R_4$ is energized and each open/close signal of its a and b contacts is inputted to the actuation circuit of the power press machine, so that the press machine is actuated.

When either one of the pair of push button switches $S_1$ is turned OFF before the limit switch $LS_1$ as the deactivating switch is turned ON after the actuation of the press machine, the relay $R_1$ is turned OFF, each of the relays $R_3$ and $R_4$ is also turned OFF and the press machine stops. When either one of the pair of push button switches $S_1$ is turned OFF after the limit switch $LS_1$ as the deactivating switch is turned ON, the relay $R_2$ is turned ON, the relay $R_3$ is self-held, and the relay $R_4$ is not turned OFF. Accordingly, the press machine maintains its operation.

When the foot switch $S_2$ is turned OFF during the operation of the press machine, the relay $R_4$ is turned OFF. Accordingly, the press machine stops without fail.

As described above, both hands of the operator always operate the pair of push button switches $S_1$ during the dangerous state after the operation of the press machine but before the operation of the deactivating switch (limit switch LS1), and safety of the operator can be thus insured. When the foot switch $S_2$ operated by the foot of the operator is disposed as in the embodiment described above, the press machine can be operated only when the pair of push button switches $S_1$ and the foot switch $S_2$ are all turned ON. Therefore, safety of the operator can be further enhanced and at, the same time, a construction, which prevents the operation of the press machine when only the foot switch $S_1$ is erroneously operated before the operation of the press machine, can be accomplished.

Figure 15:
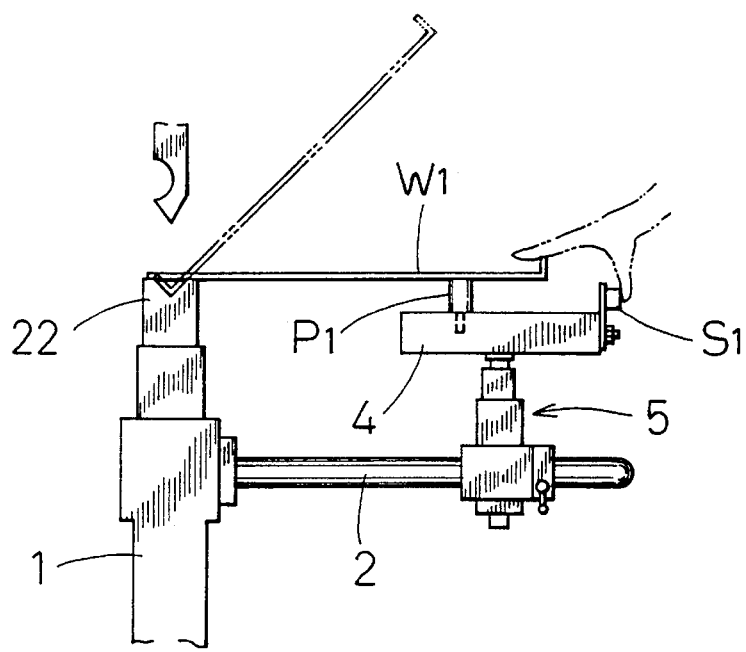
FIG. 15 is a side view in a state where a final first bending portion $B_1$ of the workpiece is bent.
Figure 16:
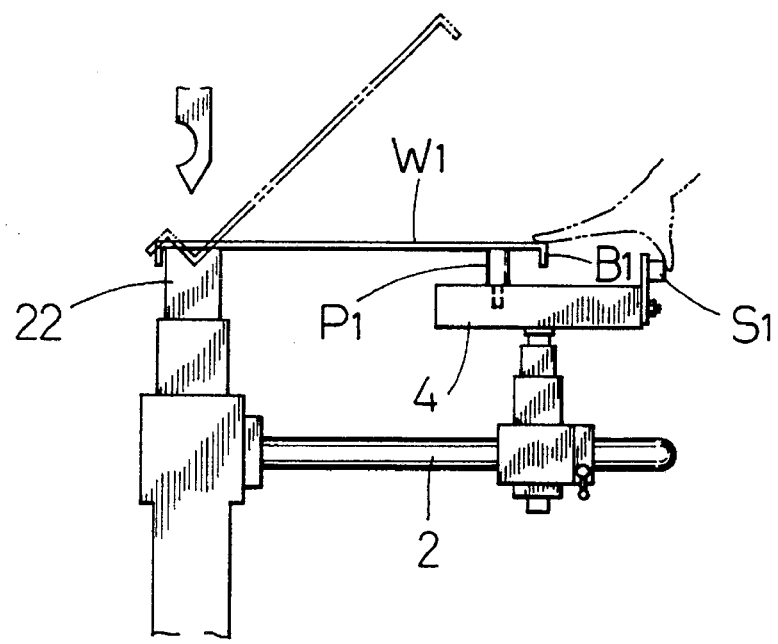
FIG. 16 is a side view in a state where an initial second bending portion $B_2$ of the workpiece $W_1$ is bent.
Figure 17:
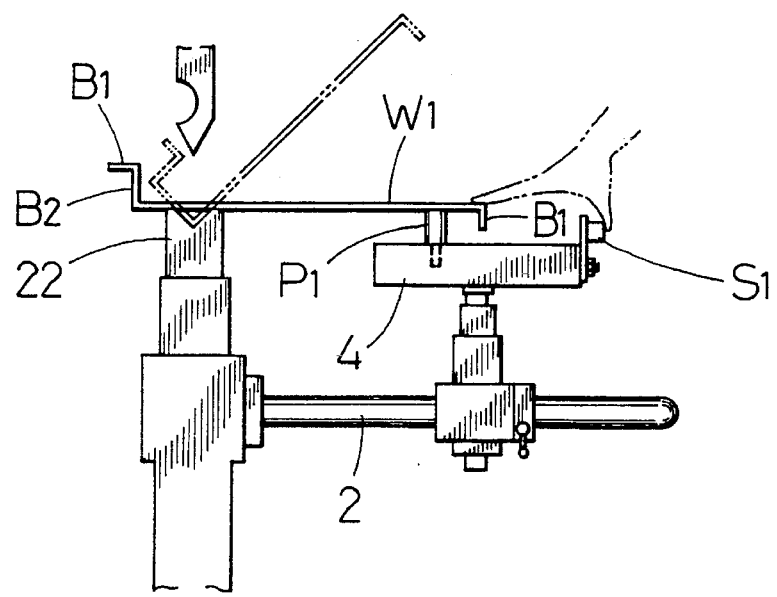
FIG. 17 is a side view in a state where an initial third bending portion $B_3$ of the workpiece $W_1$ is bent.
Figure 18:
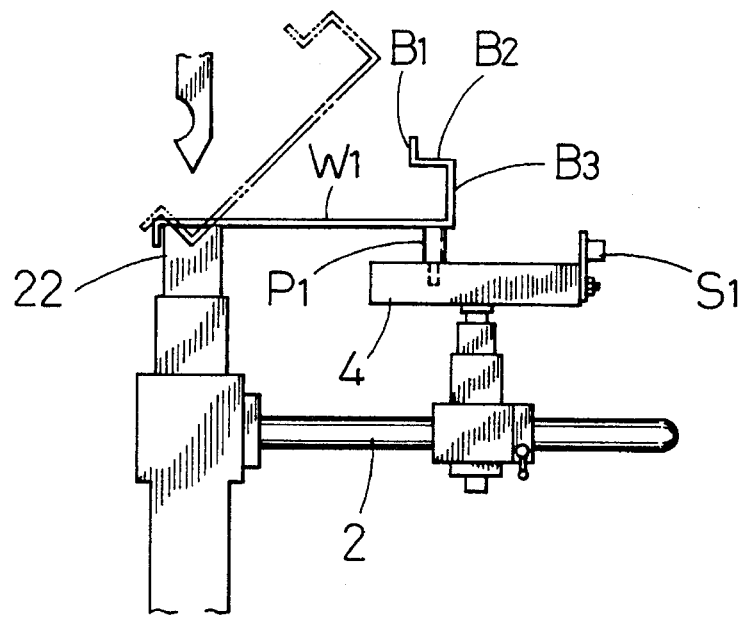
FIG. 18 is a side view in a state where a final second bending portion $B_2$ of the workpiece $W_1$ is bent.
Figure 19:
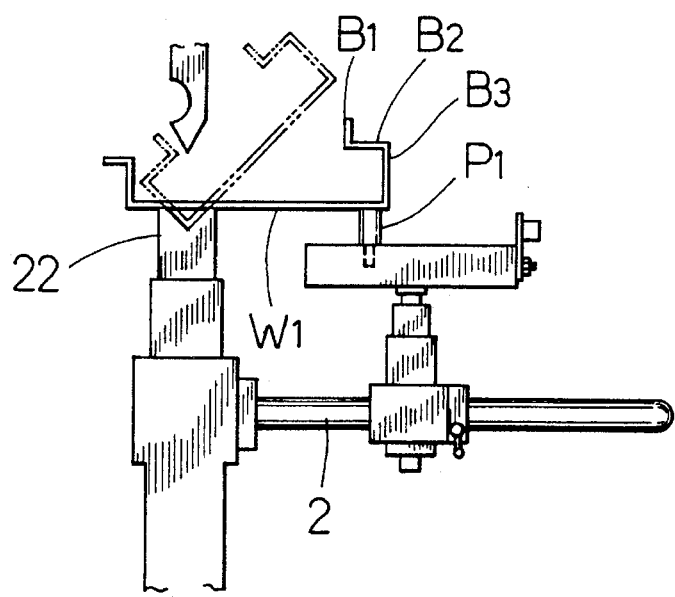
FIG. 19 is a side view in a state where a last third bending portion $B_3$ of the workpiece $W_1$ is bent.

After the first bending portion $B_1$ at the four corners of the workpiece $W_1$ is finished as shown in FIG. 15, the workpiece $W_1$ is supported between a plurality of work receiving pins $P_1$ and the die 22 while the flange-like first bending portion $B_1$ after bending is kept so as to face downward. The inside portion of each first bending portion $B_1$ is bent under this state in the opposite direction so as to form the second bending portion $B_2$, as shown in FIG. 16. Thereafter, the third bending portion $B_3$ is formed inside the second bending portion $B_2$ as shown in FIGS. 17 to 19, and the sheet-like workpiece $W_1$ can thus be bent and shaped into the box shape.

During the bending workpiece described above, the table 4 is allowed to advance with the progress of machining. Because the front side of the workpiece $W_1$ is supported by a plurality of workpiece receiving pins $P_1$ fitted into the pin holes 21 of the table 4, the workpiece $W_1$ can be supported without any problem even when the flange-like first bending portion $B_1$ faces downward as shown in FIGS. 16 and 17.

When the workpiece is simply bent, the front side of the workpiece may be directly supported by the table 4 without using the workpiece receiving pins.

Figure 22:
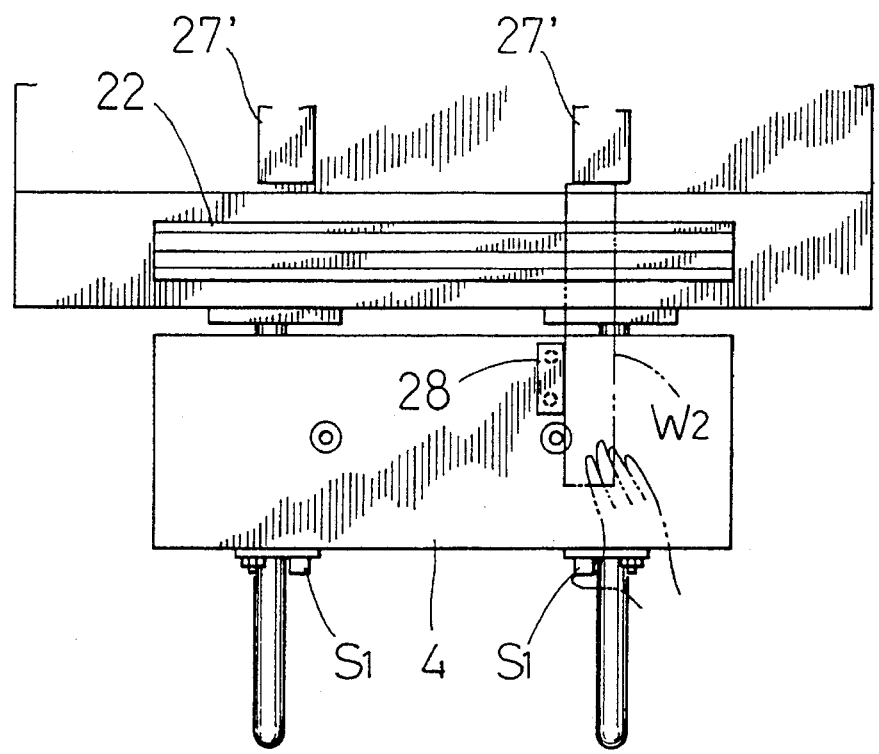
FIG. 22 is a plan view in a state where a side Gauge 28 is set to the table 4, positioning is made in a transverse direction of a workpiece $W_2$ and press machining is conducted.
Figure 23:
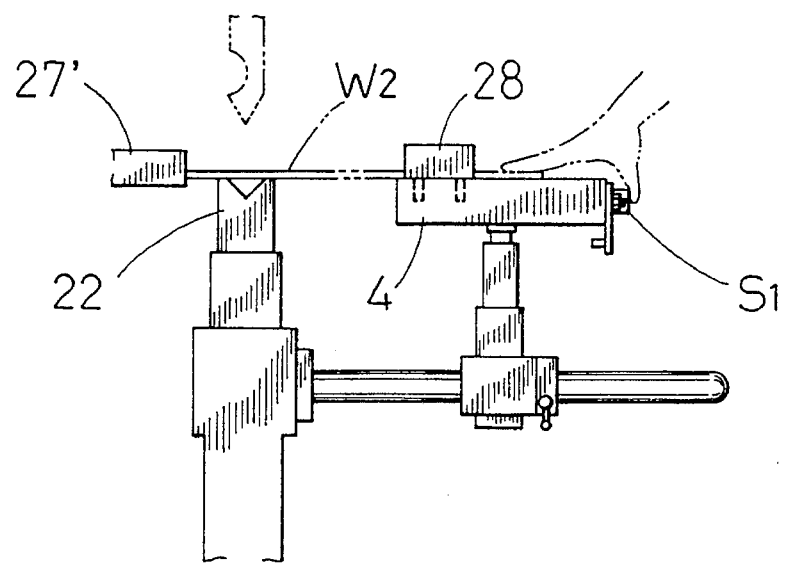
FIG. 23 is a side view of the workpiece $W_2$.
Figure 24:
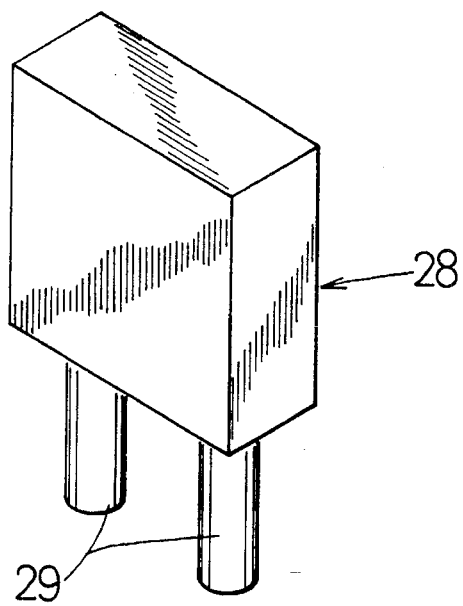
FIG. 24 is a perspective view of the side gauge 28.

Next, explanation will be given for the case where a rectangular workpiece $W_2$ is press-machined by positioning it in both depth-wise and transverse directions, with reference to FIGS. 22 to 24. Two insertion pins 29 which are to be fitted into the pin holes 21 disposed in the table 4 are integrally formed in the bottom surface of the side gauge 28 shown in FIG. 24. As shown in FIGS. 22 and 23, two insertion pins 29 of the side gauge 28 are fitted into the pin holes 21 of the table 4.

Figure 8:
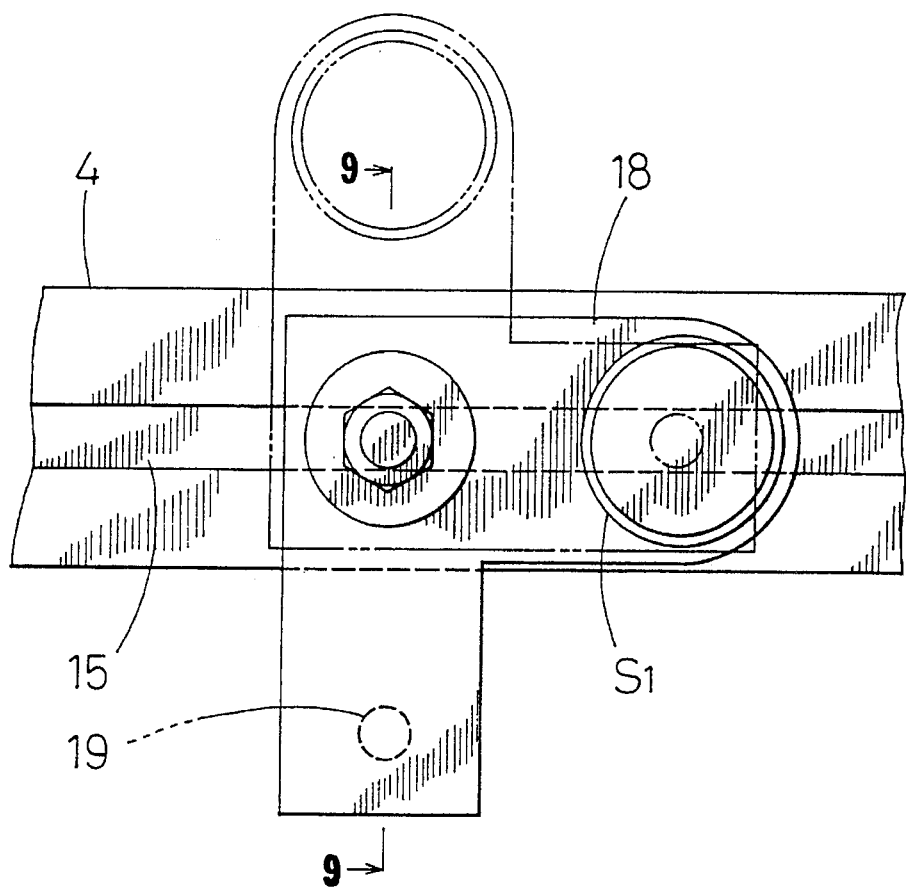
FIG. 8 is a front view of a portion of a push button switch $S_1$.
Figure 9:
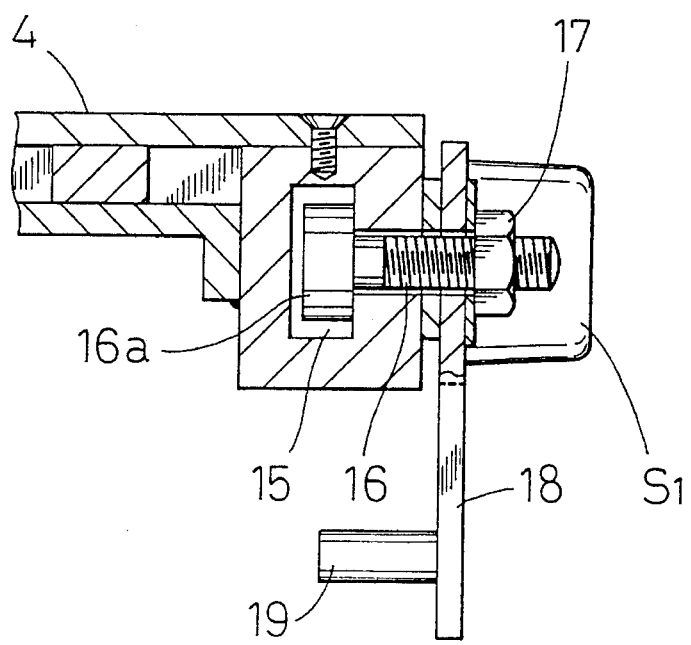
FIG. 9 is a sectional view taken along a line 9—9 of FIG. 8.
Figure 10:
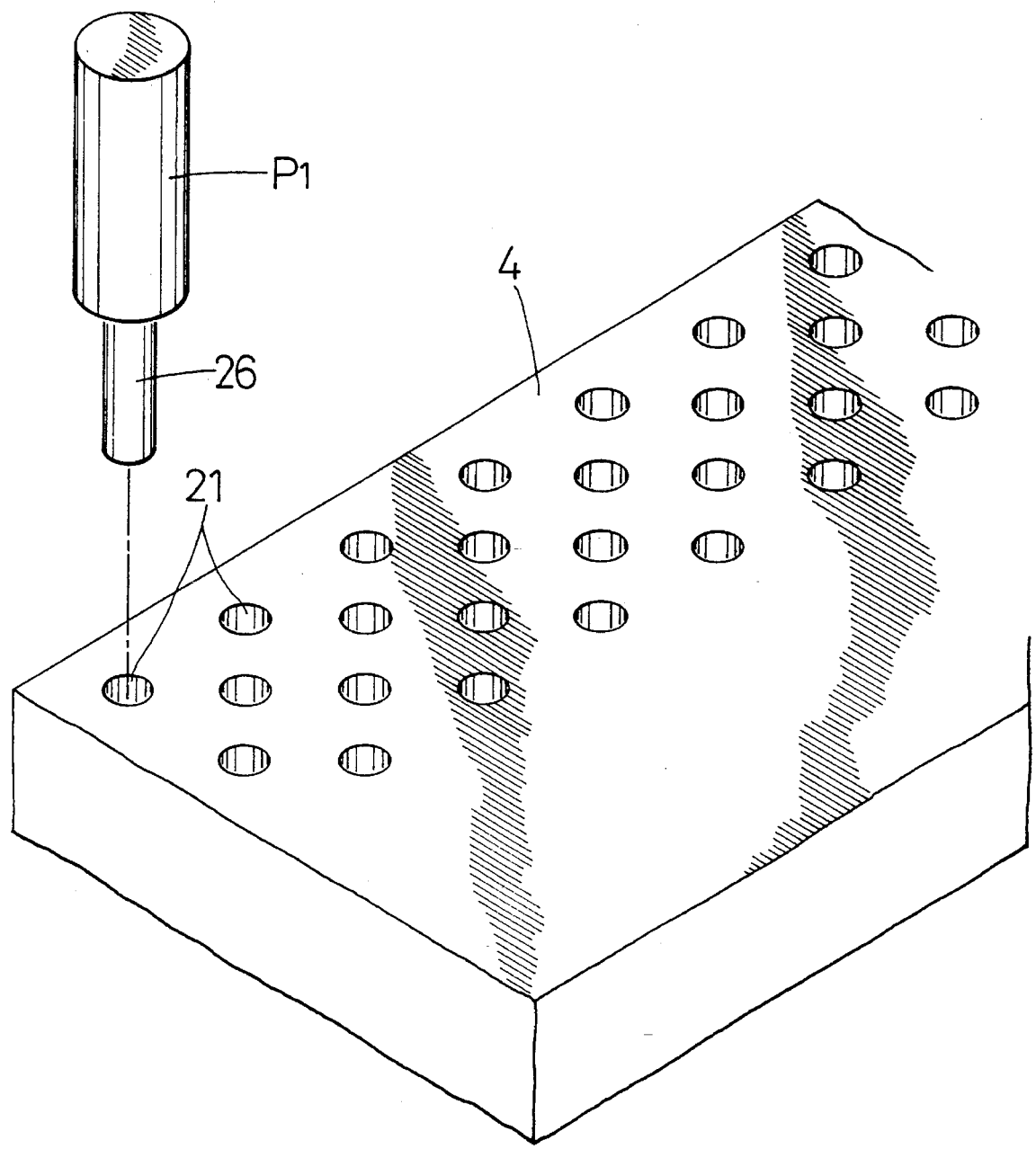
FIG. 10 is a perspective view of a part of the table 4 and a work receiving pin $P_1$.

The table 4 is set at the same height as the die 22 and each push button switch $S_1$ is kept at the normal position as indicated by a solid line in FIG. 8. Under this state, the distal end surface of the workpiece $W_2$ is butted against the back gauge 27' disposed at the depth of the die 22 and its side surface is butted against the side gauge 28 set to the table 4. In this way, the workpiece $W_2$ can be positioned in both depth-wise and transverse directions. One of the push button switches $S_1$ is operated by the hand gripping the front side of the workpiece $W_2$ and press workpiece is carried out.

The foregoing embodiments represent the case where the front end side of the workpiece is supported by the workpiece receiving pins $P_1$ to $P_3$ by fitting the work receiving pins $P_1$ to $P_3$ into the pin holes 21 of the table 4 and the case where positioning in the transverse direction of the workpiece is effected by fitting the side gauge 28 into the similar pin hole 21. However, various machining jigs can be fitted into the pin holes 21 of the table 4 in accordance with the content of the press work.

As described above, in the safety apparatus according to the present invention, a pair of push button switches $S_1$ are fitted to the front portion of the table 4 for supporting the front side of the workpiece. Accordingly, the front end side of the workpiece can be gripped while the pair of push button switches $S_1$ are operated, and one operator alone can safely execute the press workpiece without lowering the working efficiency.

When various machining jigs are fitted to the table 4 by utilizing a large number of pin holes 21 disposed in the table 4, the operations peculiar to press machining such as support of the workpiece having a flange portion facing downward, positioning in the transverse direction of the workpiece, and so forth, can be carried out simply and easily and the range of the press work can be expanded.

Next, the case where a guard type safety apparatus is removably fitted to the table 4 will be explained as another utilization method of the pin holes 4 disposed in the table 4. It is contimplated that embodiment will insure safety of the operator when the operator feeds and removes the workpieces by inserting and removing a part of his body into and from the molding portion of the press machine.

In FIGS. 27 to 30, a fitting portion 31a having a ]-shaped section is disposed at one of the end portions of a guard plate guide plate 31 in its longitudinal direction and this fitting portion 31a is fitted from the back side of the table 4. Two pins 32 are fitted into the pin hole 31b disposed in the fitting portion 31a and into the pin hole 21 described above, and in this way, the guard plate guide plate 31 is fitted to the table 4.

An air cylinder 33 is supported by a cylinder support portion 31c mounted at one of the end portions of the guard plate guide plate 31 in its longitudinal direction. The lower end portion of the guard plate 35 comprising a transparent acrylic resin plate is fitted into the guide groove 34 defined in the guard plate guide plate 31, and the distal end portion of a rod 33a of the air cylinder 33 is interconnected to one of the side end surfaces of the guard plate 35.

Accordingly, the guard plate 35 is caused to reciprocate in a direction orthogonally crossing the moving direction of the table 4 as the rod 33a of the air cylinder 33 moves back and forth, and the front surface of the die 22' disposed on the bed 1 of the power press machine is opened and closed by the guard plate 35.

While the guard plate 35 is open, the operator directly feeds and removes the workpiece $W_2$ to and from the die 22. Limit switches $LS_{12}$, $LS_{13}$ for confirming closure and opening of the guard plate, respectively, are disposed at both moving end portions of this guard plate 35 (see FIG. 30).

Figure 31:
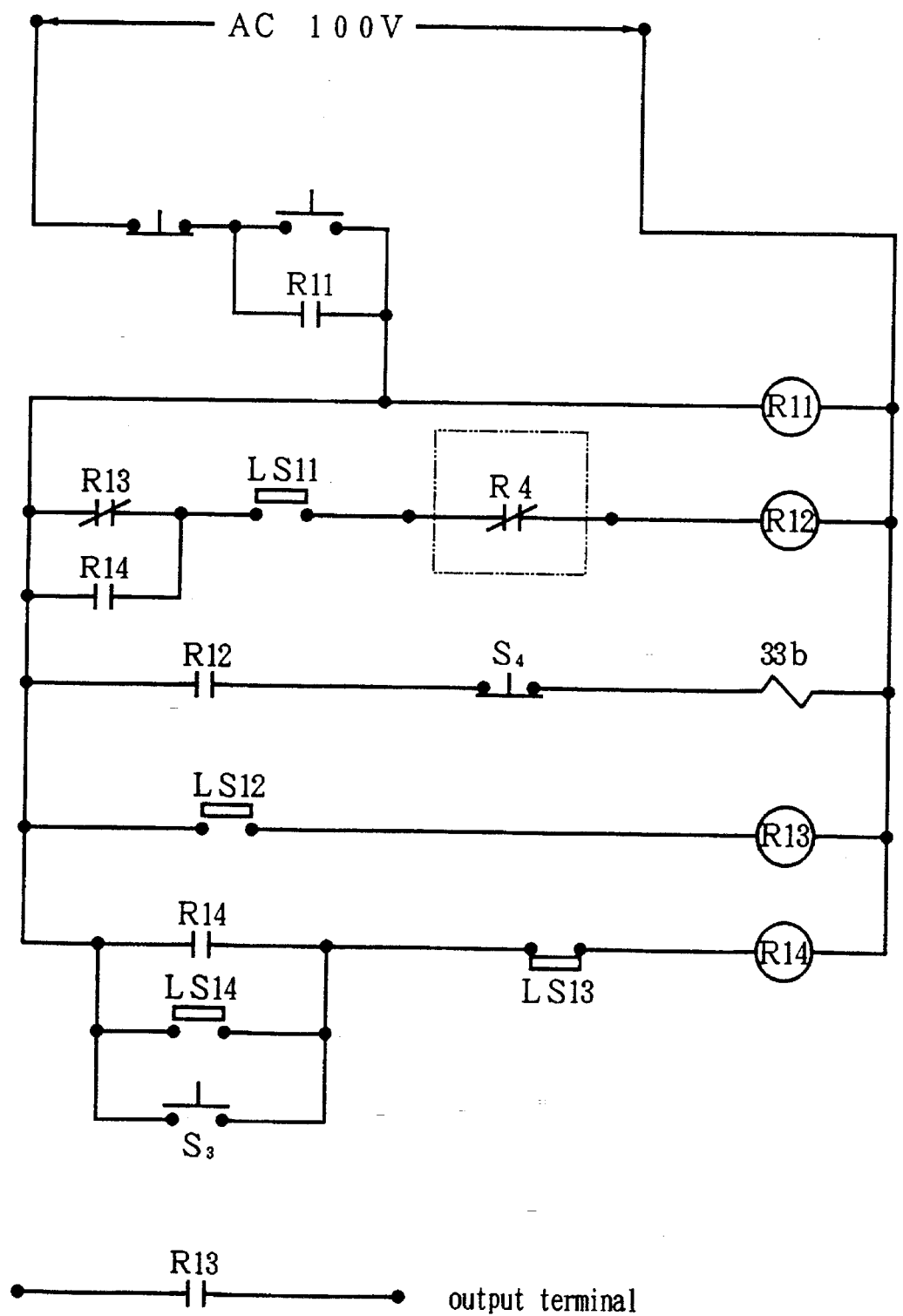
FIG. 31 is an operation circuit diagram for operating the guard plate 35 use of the air cylinder 33.
Figure 32:
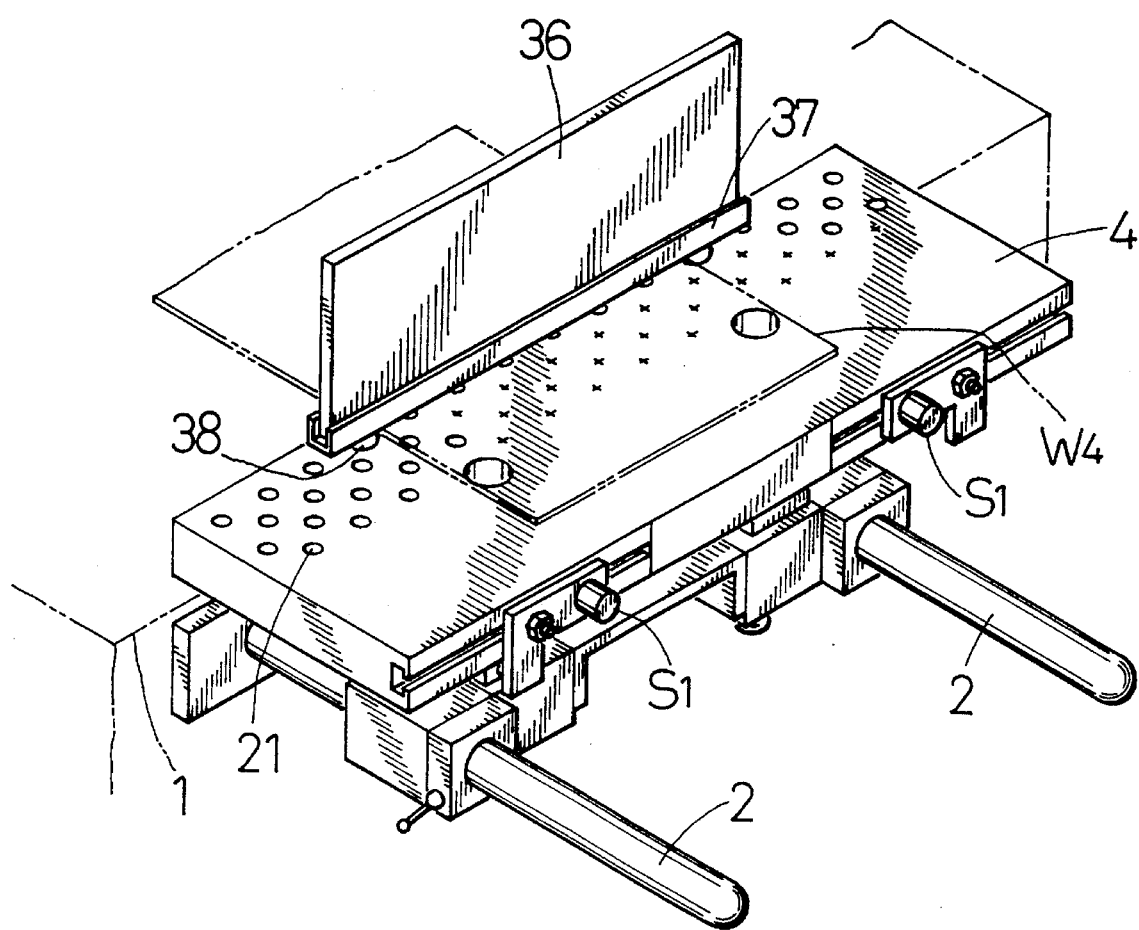
FIG. 32 is a perspective view in a state where a single guard plate 36 is fitted to the table 4 of the safety apparatus according to the present invention.
Figure 33:
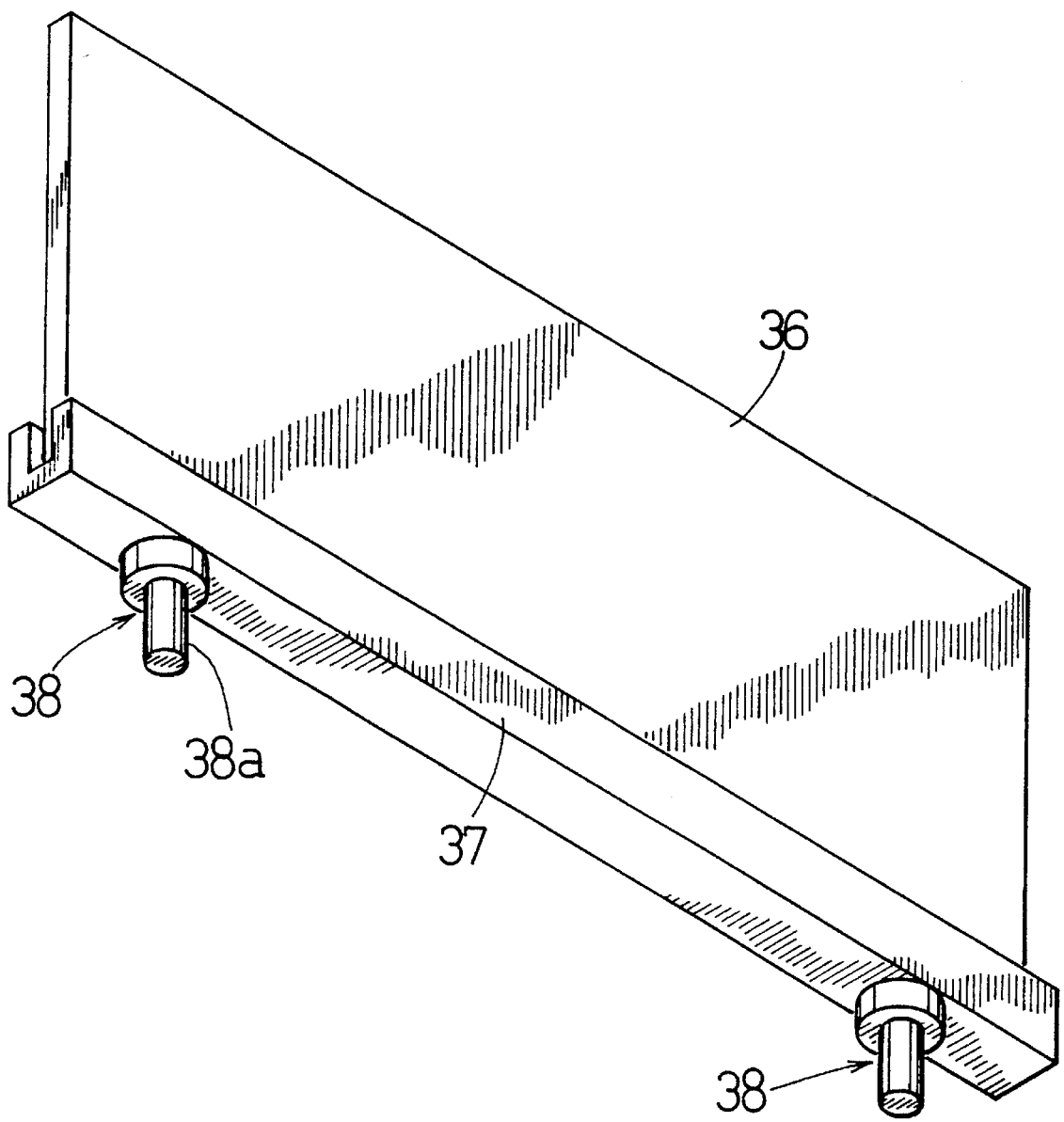
FIG. 33 is a perspective view of the single guard plate 36.

FIG. 31 is an operation circuit diagram for operating the guard type safety apparatus described above, and the operation of this guard type safety apparatus will be explained with reference to this diagram. Incidentally, reference symbols $LS_{11}$ and $LS_{14}$ represent limit switches for detecting the ascension end and descension end of the slide portion 23 of the power press machine, respectively.

First, when the slide portion 23 of the power press machine exists at the ascension end portion, the limit switch $LS_{11}$ for detecting the ascension end is turned ON and the guard plate 35 is kept closed. When the guard plate opening confirmation button $S_2$ is pushed under this state, the relay $R_{14}$ is energized and a self-holding circuit is formed. Therefore, the a contact of the relay $R_{14}$ connected in parallel with the b contact of the relay $R_{13}$ is closed, and the relay $R_{12}$ is energized. Due to this energized relay $R_{12}$, its a contact is closed, the solenoid 33b of the air cylinder 33 is energized, and the guard plate 35 is opened.

When this guard plate 35 opens completely, the limit switch $LS_{13}$ for confirming opening of the guard plate is opened, and the relay $R_{14}$ is deenergized. However, because the limit switch $LS_{12}$ for confirming closure of the guard plate remains open, the relay $R_{13}$ is deenergized, its b contact is closed, and the relay $R_{12}$ is kept energized. Accordingly, the guard plate 35 remains open.

When the operator pushes the pair of push button switches $S_1$ of the double-hand operation type disposed on the table 4 under this state, the b contact of the relay $R_4$ (see FIG. 26) constituting the operation circuit of the safety apparatus according to the present invention opens, and the relay $R_{12}$ is deenergized. As a result, the a contact of the relay $R_{12}$ opens the solenoid 33b of the air cylinder 33 is deenergized, the guard plate 35 is closed, and the limit switch $LS_{12}$ for confirming closure of the guard plate is turned ON.

Here, if the pair of push button switches $S_1$ are turned OFF while the guard plate 35 is being closed but the limit switch $LS_{12}$ is turned ON, the guard plate 35 is again opened. Accordingly, the push button switch $S_1$ must be kept pushed until the limit switch $LS_{12}$ is turned ON (until the guard plate 35 is completely closed).

When the guard plate 35 is closed and the limit switch $LS_{12}$ is turned ON, the relay $R_3$ is energized and its b contact is turned OFF. As a result, the relay $R_{12}$ is turned OFF and the solenoid 33b of the air cylinder 33 is not energized any more. Accordingly, even when the push button switch $S_1$ is turned OFF, the guard plate 35 is kept closed.

When the guard plate 35 is closed and the relay $R_{13}$ is energized, the a contact of the relay $R_{13}$ is closed and its signal is inputted to the actuation circuit of the power press machine. As a result, the press machine is operated. The slide portion 23 lowers, the limit switch $LS_{11}$ for detecting the ascension end is turned OFF, the limit switch $LS_{14}$ for detecting the descension end is turned ON at the descension end of the slide portion 23, the relay $R_{14}$ is energized, and the self-holding circuit is formed. Accordingly, the a contact of the relay $R_{14}$ is closed, the slide portion 23 reaches the ascension end, the limit switch $LS_{11}$ is turned ON, the relay $R_{12}$ is energized and the guard plate 35 opens. Incidentally, reference symbol $S_4$ in FIG. 31 represents the switch for confirming closure of the guard plate.

As described above, the guard plate 35 is always closed during the operation of the power press machine. Therefore, a part of the body of the operator cannot enter the molding portion of the press machine and safety of the operator can be insured.

The embodiment shown in FIGS. 32 to 35 executes machining of a sheet-like workpiece $W_4$ by removably fitting the single guard plate 36 to the table 4 by utilizing the pin holes 21 formed in the table 4, and so preventing a part of the body of the operator from entering the molding portion of the press machine.

Figure 34:
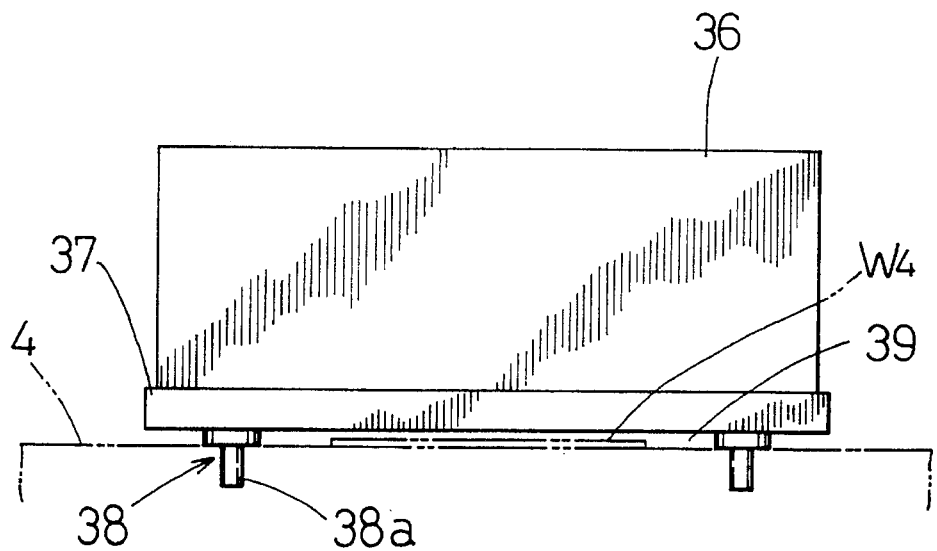
FIG. 34 is a substantial front view in a state where the single guard plate 36 is fitted to the table 4 of the safety apparatus according to the present invention.
Figure 35:
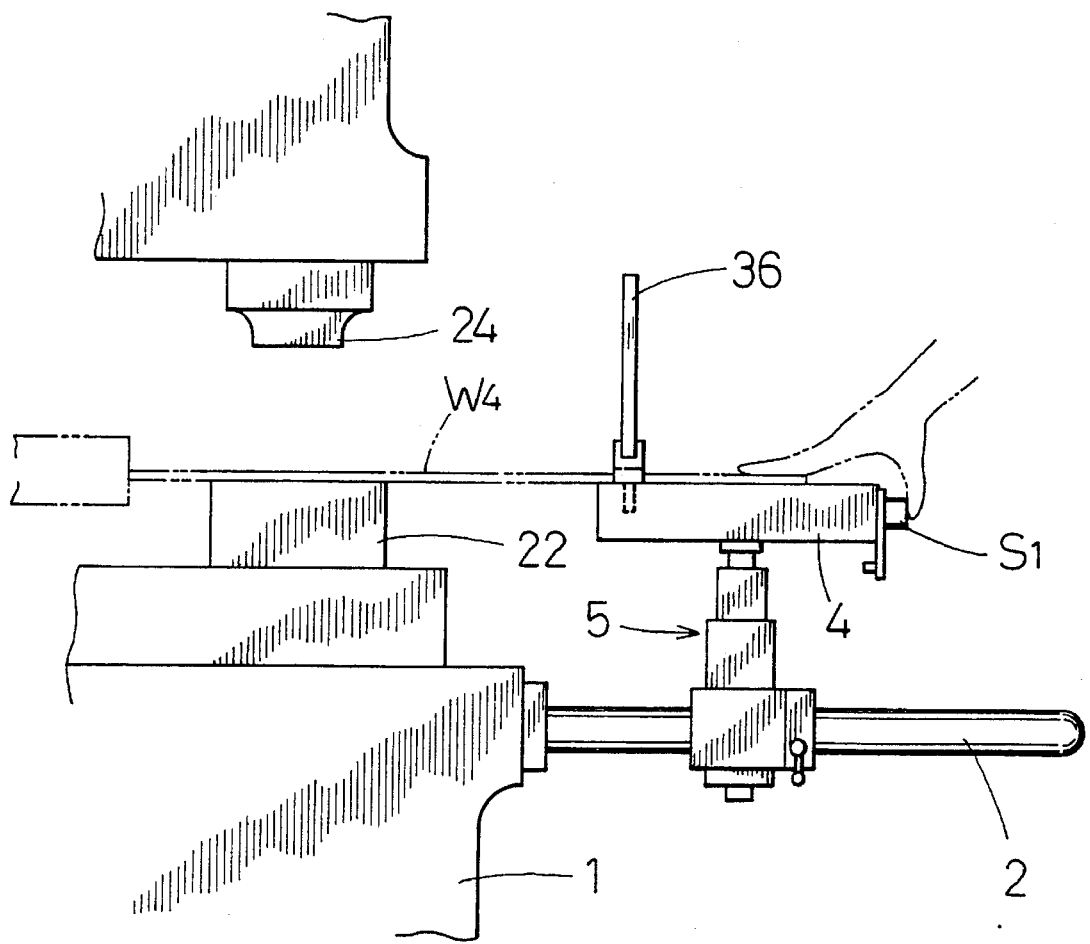
FIG. 35 is a side view in a state where the single guard plate 36 is fitted to the table 4 of the safety apparatus according to the present invention and the press workpiece is carried out.

In other words, the guard plate 36 comprising the transparent acrylic resin plate is integrally fitted into the groove portion of the upper surface of a receiving member 37, and a pair of pins 38 having a step portion is so implanted to the bottom surface of the receiving member 37 as to protrude therefrom. When the small diameter portion 38a of the pair of pins 38 is fitted into the pin hole 21 of the table 4, the guard plate 36 can be fitted to the table 4. Since the pair of pins 38 have the step portion, a predetermined gap 39 is defined between the upper surface of the table 4 and the lower surface of the receiving member 37 under this state as shown in FIG. 34.

The sheet-like workpiece $W_4$ is inserted into this gap 39 from the front side of the table 4 and its distal end portion is placed on the die 22 disposed on the bed 1. While the front end portion of the workpiece $W_4$ is supported by both hands of the operator, the pair of push button switches are operated and a predetermined operation is carried out. When this single guard plate 36 is used, the press machine may be so constituted as to be operated by only the operation of the foot switch $S_2$.

As described above, the sheet-like workpiece $W_4$ can be supplied to the portion of the die 22 from the gap 39 and because the front side portion of the die 22 is always covered with the guard plate 36 and a part of the body of the operator is prevented from entering the molding portion of the press machine, safety can be insured without inviting trouble for the press operation.

What is claimed is:

1. A safety apparatus, primarily mounted to the side of a bed of a power press machine on which an operator is positioned, for insuring safety of the operator of the power press machine, comprising:

a table, for supporting the front end portion of a workpiece, fitted so as to be movable toward and away from the bed at substantially the same height as a fixed mold set to said bed side and on the side of said bed where the operator is positioned;

a pair of two-hand operation type switches fitted to the front side portion of said table with a gap between them, and operated by both hands of the operator; and a deactivating switch for deactivating said pair of two-hand operation type switches when a movable mold set to a slide portion side of the power press machine approaches to within a predetermined distance of said fixed mold set to the bed side to provide a safety state;

wherein the slide portion is allowed to operate only when said pair of two-hand operation type switches are operated by both hands of the operator and are turned ON.

2. A safety apparatus according to claim 1, which further includes a foot switch operated by a foot of the operator, and wherein the slide portion of the power press machine can be operated only when said pair of two-hand operation type switches are operated by both hands of the operator and turned on and when said foot switch is operated and turned on.

3. A safety apparatus according to claim 1, wherein said pair of two-hand operation type switches are allowed to move only outward from positions corresponding to said minimum gap set between them.

4. A safety apparatus according to claim 1, wherein said table can be fitted and removed to and from table support members.

5. A safety apparatus according to claim 1, wherein a large number of pin holes are defined in said table.

6. A safety apparatus according to claim 5, wherein a machining jig is removably fitted to said table by utilizing said pin holes.

7. A safety apparatus according to claim 5, wherein a guard type safety apparatus, having a construction in which a guard plate moves back and forth in a direction orthogonal to the moving direction of said table by the operation of an air cylinder, is fitted to said table by utilizing said pin holes.

8. A safety apparatus according to claim 7, wherein said guard plate is removably fitted to said table by utilizing said pin holes with a gap for permitting the insertion of a sheet-like workpiece provided between said guard plate and the upper surface of said table.

* * * * *